(12) United States Patent
Zhang et al.

(10) Patent No.: US 11,849,150 B2
(45) Date of Patent: Dec. 19, 2023

(54) HIGH LEVEL CONTROL OF FILTERING IN VIDEO CODING

(71) Applicant: Bytedance Inc., Los Angeles, CA (US)

(72) Inventors: Li Zhang, San Diego, CA (US); Ye-Kui Wang, San Diego, CA (US)

(73) Assignee: BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/955,856

(22) Filed: Sep. 29, 2022

(65) Prior Publication Data

US 2023/0041260 A1 Feb. 9, 2023

Related U.S. Application Data

(63) Continuation of application No. PCT/US2021/025734, filed on Apr. 5, 2021.

(60) Provisional application No. 63/005,413, filed on Apr. 5, 2020.

(51) Int. Cl.
*H04N 19/70* (2014.01)
*H04N 19/184* (2014.01)
*H04N 19/186* (2014.01)

(52) U.S. Cl.
CPC .......... *H04N 19/70* (2014.11); *H04N 19/184* (2014.11); *H04N 19/186* (2014.11)

(58) Field of Classification Search
CPC ..... H04N 19/70; H04N 19/184; H04N 19/186
See application file for complete search history.

(56) References Cited

U.S. PATENT DOCUMENTS

| | | | |
|---|---|---|---|
| 10,623,774 B2* | 4/2020 | Zhao | H04N 19/61 |
| 11,575,887 B2* | 2/2023 | Zhang | H04N 19/105 |
| 2016/0353108 A1 | 12/2016 | Zhang et al. | |
| 2017/0142418 A1 | 5/2017 | Li et al. | |
| 2019/0208212 A1 | 7/2019 | Horowitz | |

FOREIGN PATENT DOCUMENTS

| | | |
|---|---|---|
| CA | 3111043 A1 | 3/2020 |
| CA | 3113219 A1 | 3/2020 |
| WO | 2020007291 A1 | 1/2020 |

(Continued)

OTHER PUBLICATIONS

Flynn et al., "Overview of the Range Extensions for the HEVC Standard: Tools, Profiles, and Performance," IEEE Transactions on Circuits and Systems for Video Technology, vol. 26, No. 1, Jan. 2016, 16 pages.

(Continued)

*Primary Examiner* — Jae N Noh
(74) *Attorney, Agent, or Firm* — Conley Rose, P.C.

(57) ABSTRACT

Several techniques for video encoding and video decoding are described. One example method includes performing a conversion between a video picture of a video comprising one or more slices and a bitstream of the video picture according to a rule. The rule specifies that that whether a first syntax element indicating a usage of a coding tool is present at a first level is based on a syntax flag indicating whether a syntax structure of a second level is not present at the first level, wherein the second level is higher than the first level, and wherein the second level is the video picture level or higher than the video picture level.

15 Claims, 17 Drawing Sheets

1300 performing a conversion between a video picture of a video comprising one or more slices and a bitstream of the video picture according to a rule specifying that whether a first syntax element indicating a usage of a coding tool is present at a first level is based on a syntax flag indicating whether a syntax structure of a second level is not present at the first level, where the second level is higher than the first level and the second level is the video picture level or higher than the video picture level ─── 1310

(56) References Cited

FOREIGN PATENT DOCUMENTS

| | | |
|---|---|---|
| WO | 2020015592 A1 | 1/2020 |
| WO | 2020058890 A1 | 3/2020 |

OTHER PUBLICATIONS

Foreign Communication From a Related Counterpart Application, Indian Application No. 202227056194, Indian Office Action dated Dec. 15, 2022, 4 pages.

Communication From a Related Counterpart Application, PCT Application No. PCT/US2021/025734, International Search Report dated Aug. 26, 2021, 34 pages.

* cited by examiner

HIGH LEVEL CONTROL OF FILTERING IN VIDEO CODING

CROSS REFERENCE TO RELATED APPLICATIONS

This application is a continuation of International Patent Application No. PCT/US2021/025734, filed on Apr. 5, 2021 which claims the priority to and benefits of U.S. Provisional Application No. 63/005,413, filed on Apr. 5, 2020. All the aforementioned patent applications are hereby incorporated by reference in their entireties.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders for processing coded representation of video using control information useful for decoding of the coded representation.

In one example aspect, a video processing method is disclosed. The method includes performing a conversion between a video picture of a video comprising one or more slices and a bitstream of the video picture according to a rule. The rule specifies that whether a first syntax element indicating a usage of a coding tool is present at a first level is based on a syntax flag indicating whether a syntax structure of a second level is not present at the first level, where the second level is higher than the first level. The second level is the video picture level or higher than the video picture level.

In another example aspect, a video processing method is disclosed. The method includes performing a conversion between a video and a bitstream of the video according to a rule. The rule specifies that a syntax element in a sequence parameter set of the video indicates whether a Luma Mapping with Chroma Scaling (LMCS) tool is enabled for a Coded Layer Video Sequence (CLVS) referring to the sequence parameter set.

In another example aspect, a video processing method is disclosed. The method includes performing a conversion between a video and a bitstream of the video according to a rule. The rule specifies that a syntax element in a sequence parameter set of the video indicates whether a Sample Adaptive Offset (SAO) tool is enabled for a Coded Layer Video Sequence (CLVS) referring to the sequence parameter set.

In another example aspect, a video processing method is disclosed. The method includes performing a conversion between a video picture of a video comprising one or more slices and a bitstream of the video picture according to a rule. The rule specifies that whether and/or how usage of a scaling tool is indicated is determined based on whether the video picture includes a single slice. The usage of the scaling tool comprises whether a Luma Mapping with Chroma Scaling (LMCS) tool is allowed for the conversion and further comprises a number of scaling mode types allowed for the conversion.

In another example aspect, a video processing method is disclosed. The method includes performing a conversion between a video picture of a video comprising one or more slices and a bitstream of the video picture according to a rule. The rule specifies that whether and/or how an allowed slice type is indicated is a picture header and/or a slice header is determined based on whether the video picture includes a single slice.

In another example aspect, a video processing method is disclosed. The method includes performing a conversion between a video picture of a video comprising one or more slices and a bitstream of the video picture according to a rule. The rule specifies that a mode type of a coding tool is indicated at a video unit level for the conversion.

In another example aspect, a video processing method is disclosed. The method includes performing a conversion between a video picture of a video comprising one or more slices and a bitstream of the video picture according to a rule. The rule specifies that a non-binary syntax element or multiple syntax flags at a first video unit level are used to indicate usage of a coding tool at a second video unit level that is lower than the first video unit level.

In another example aspect, a video processing method is disclosed. The method includes performing a conversion between a video comprising one or more video pictures comprising one or more slices and a coded representation of the video; wherein the coded representation conforms to a format rule, wherein the format rule specifies which luma mapping with chroma scaling modes or scaling list mode types are applicable to the conversion of a slice is indicated by a picture header syntax structure in a slice header or a picture header in a picture comprising a single slice.

In another example aspect, another video processing method is disclosed. The method includes performing a conversion between a video comprising one or more video pictures comprising one or more slices and a coded representation of the video; wherein the coded representation conforms to a format rule, wherein the format rule specifies to include an indicator that indicates enablement of a luma mapping with chroma scaling (LMCS) mode at a first video level dependent on a non-binary LMCS related syntax element at a higher level and whether a picture only consists of one slice.

In another example aspect, another video processing method is disclosed. The method includes performing a conversion between a video comprising one or more video pictures comprising one or more slices and a coded representation of the video; wherein the coded representation conforms to a format rule, wherein the format rule specifies to include an indicator that indicates enablement of an explicit scaling list (ESL) mode at a first video level dependent on a non-binary LMCS related syntax element at a higher level and whether a picture only consists of one slice.

In another example aspect, another video processing method is disclosed. The method includes performing a conversion between a video comprising one or more pictures comprising one or more slices and a coded representation of the video, wherein the coded representation conforms to a format rule, wherein the format rule specifies that whether a picture includes exactly one slice controls whether a slice type or slice type flags in a slice header of the exactly one slice.

In another example aspect, another video processing method is disclosed. The method includes performing a conversion between a video comprising one or more pictures comprising one or more video regions and a coded representation of the video, wherein the coded representation conforms to a format rule, wherein the format rule specifies to include a two-level signaling of applicability of a filtering coding tool (TX) to a video region.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclose. The code embodies one of the methods described herein in the form of processor-executable code.

These, and other, features are described throughout the present document.

DETAILED DESCRIPTION

Figure 2:
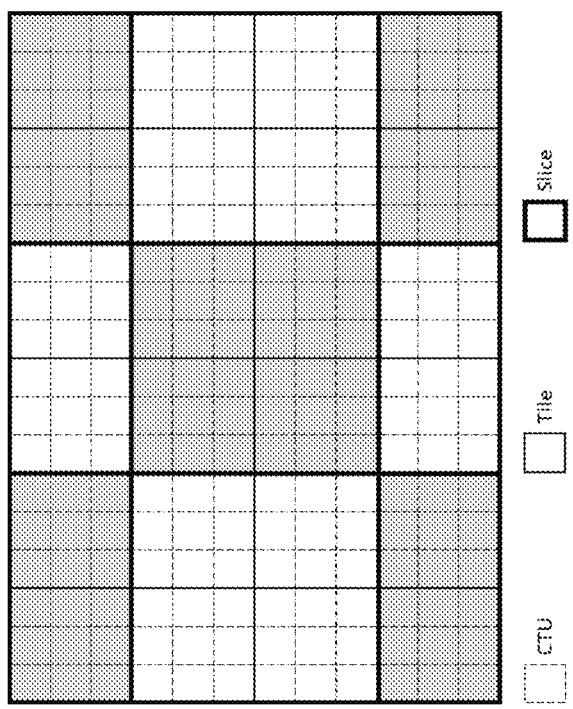
FIG. 2 shows an example of rectangular slice partitioning of a picture, where the picture is divided into 24 tiles (6 tile columns and 4 tile rows) and 9 rectangular slices.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also. In the present document, editing changes are shown to text by strikethrough indicating cancelled text and highlight indicating added text (including boldface italic), with respect to the current draft of the VVC specification.

1. Overview

This document is related to video coding technologies. Specifically, it is about improvements on signalling of Adaptive Loop Filter (ALF), Sample Adaptive Offset (SAO), Luma Mapping with Chroma Scaling (LMCS), scaling list. The ideas may be applied individually or in various combination, to any video coding standard or non-standard video codec that supports multi-layer video coding, e.g., the being-developed Versatile Video Coding (VVC).

2. Abbreviations

ALF Adaptive Loop Filter
APS Adaptation Parameter Set
AU Access Unit
AUD Access Unit Delimiter
AVC Advanced Video Coding
CLVS Coded Layer Video Sequence
CPB Coded Picture Buffer
CRA Clean Random Access
CTU Coding Tree Unit
CVS Coded Video Sequence
DCI Decoding Capability Information
DPB Decoded Picture Buffer
EOB End Of Bitstream
EOS End Of Sequence
GDR Gradual Decoding Refresh
HEVC High Efficiency Video Coding
HRD Hypothetical Reference Decoder
IDR Instantaneous Decoding Refresh
JEM Joint Exploration Model
LMCS Luma Mapping with Chroma Scaling
MCTS Motion-Constrained Tile Sets
NAL Network Abstraction Layer
OLS Output Layer Set
PH Picture Header
PPS Picture Parameter Set
PTL Profile, Tier and Level
PU Picture Unit
RADL Random Access Decodable Leading (Picture)
RAP Random Access Point
RASL Random Access Skipped Leading (Picture)
RBSP Raw Byte Sequence Payload
RPL Reference Picture List SAO Sample Adaptive Offset
SEI Supplemental Enhancement Information
SPS Sequence Parameter Set
STSA Step-wise Temporal Sublayer Access
SVC Scalable Video Coding
VCL Video Coding Layer
VPS Video Parameter Set
VTM VVC Test Model
VUI Video Usability Information
VVC Versatile Video Coding 3. Initial Discussion Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/High Efficiency Video Coding (HEVC) standards. Since H.262, the video coding standards are based on the hybrid video coding structure wherein temporal prediction plus transform coding are utilized. To explore the future video coding technologies beyond HEVC, the Joint Video Exploration Team (JVET) was founded by Video Coding Experts Group (VCEG) and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion, Final Draft International Standard (FDIS), at the July 2020 meeting.

3.1. Picture Partitioning Schemes in HEVC

HEVC includes four different picture partitioning schemes, namely regular slices, dependent slices, tiles, and Wavefront Parallel Processing (WPP), which may be applied for Maximum Transfer Unit (MTU) size matching, parallel processing, and reduced end-to-end delay.

Regular slices are similar as in H.264/AVC. Each regular slice is encapsulated in its own network abstraction layer (NAL) unit, and in-picture prediction (intra sample prediction, motion information prediction, coding mode prediction) and entropy coding dependency across slice boundaries are disabled. Thus a regular slice can be reconstructed independently from other regular slices within the same picture (though there may still have interdependencies due to loop filtering operations).

The regular slice is the only tool that can be used for parallelization that is also available, in virtually identical form, in H.264/AVC. Regular slices based parallelization does not require much inter-processor or inter-core communication (except for inter-processor or inter-core data sharing for motion compensation when decoding a predictively coded picture, which is typically much heavier than inter-processor or inter-core data sharing due to in-picture prediction). However, for the same reason, the use of regular slices can incur substantial coding overhead due to the bit cost of the slice header and due to the lack of prediction across the slice boundaries. Further, regular slices (in contrast to the other tools mentioned below) also serve as the key mechanism for bitstream partitioning to match MTU size requirements, due to the in-picture independence of regular slices and that each regular slice is encapsulated in its own NAL unit. In many cases, the goal of parallelization and the goal of MTU size matching place contradicting demands to the slice layout in a picture. The realization of this situation led to the development of the parallelization tools mentioned below.

Dependent slices have short slice headers and allow partitioning of the bitstream at treeblock boundaries without breaking any in-picture prediction. Basically, dependent slices provide fragmentation of regular slices into multiple NAL units, to provide reduced end-to-end delay by allowing a part of a regular slice to be sent out before the encoding of the entire regular slice is finished.

In WPP, the picture is partitioned into single rows of coding tree blocks (CTBs). Entropy decoding and prediction are allowed to use data from CTBs in other partitions. Parallel processing is possible through parallel decoding of CTB rows, where the start of the decoding of a CTB row is delayed by two CTBs, so to ensure that data related to a CTB above and to the right of the subject CTB is available before the subject CTB is being decoded. Using this staggered start (which appears like a wavefront when represented graphically), parallelization is possible with up to as many processors/cores as the picture contains CTB rows. Because in-picture prediction between neighboring treeblock rows within a picture is permitted, the required inter-processor/inter-core communication to enable in-picture prediction can be substantial. The WPP partitioning does not result in the production of additional NAL units compared to when it is not applied, thus WPP is not a tool for MTU size matching. However, if MTU size matching is required, regular slices can be used with WPP, with certain coding overhead.

Tiles define horizontal and vertical boundaries that partition a picture into tile columns and rows. Tile column runs from the top of a picture to the bottom of the picture. Likewise, tile row runs from the left of the picture to the right of the picture. The number of tiles in a picture can be derived simply as number of tile columns multiply by number of tile rows.

The scan order of CTBs is changed to be local within a tile (in the order of a CTB raster scan of a tile), before decoding the top-left CTB of the next tile in the order of tile raster scan of a picture. Similar to regular slices, tiles break in-picture prediction dependencies as well as entropy decoding dependencies. However, they do not need to be included into individual NAL units (same as WPP in this regard); hence tiles cannot be used for MTU size matching. Each tile can be processed by one processor/core, and the inter-processor/inter-core communication required for in-picture prediction between processing units decoding neighboring tiles is limited to conveying the shared slice header in cases a slice is spanning more than one tile, and loop filtering related sharing of reconstructed samples and metadata. When more than one tile or WPP segment is included in a slice, the entry point byte offset for each tile or WPP segment other than the first one in the slice is signaled in the slice header.

For simplicity, restrictions on the application of the four different picture partitioning schemes have been specified in HEVC. A given coded video sequence cannot include both tiles and wavefronts for most of the profiles specified in HEVC. For each slice and tile, either or both of the following conditions must be fulfilled: 1) all coded treeblocks in a slice belong to the same tile; 2) all coded treeblocks in a tile belong to the same slice. Finally, a wavefront segment contains exactly one CTB row, and when WPP is in use, if a slice starts within a CTB row, it must end in the same CTB row.

In some embodiments, HEVC specifies three motion constrained tile set (MCTS)-related supplemental enhancement information (SEI) messages, namely temporal MCTSs SEI message, MCTSs extraction information set SEI message, and MCTSs extraction information nesting SEI message.

The temporal MCTSs SEI message indicates existence of MCTSs in the bitstream and signals the MCTSs. For each MCTS, motion vectors are restricted to point to full-sample locations inside the MCTS and to fractional-sample locations that require only full-sample locations inside the MCTS for interpolation, and the usage of motion vector candidates for temporal motion vector prediction derived from blocks outside the MCTS is disallowed. This way, each MCTS may be independently decoded without the existence of tiles not included in the MCTS.

The MCTSs extraction information sets SEI message provides supplemental information that can be used in the MCTS sub-bitstream extraction (specified as part of the semantics of the SEI message) to generate a conforming bitstream for an MCTS set. The information consists of a number of extraction information sets, each defining a number of MCTS sets and containing raw byte sequence payload (RBSP) bytes of the replacement video parameter sets (VPSs), sequence parameter sets (SPSs), and picture parameter sets (PPSs) to be used during the MCTS sub-bitstream extraction process. When extracting a sub-bitstream according to the MCTS sub-bitstream extraction process, parameter sets (VPSs, SPSs, and PPSs) need to be rewritten or replaced, slice headers need to be slightly updated because one or all of the slice address related syntax elements (including first_slice_segment_in_pic_flag and slice_segment_address) typically would need to have different values.

3.2. Partitioning of Pictures in VVC

In VVC, A picture is divided into one or more tile rows and one or more tile columns. A tile is a sequence of CTUs that covers a rectangular region of a picture. The CTUs in a tile are scanned in raster scan order within that tile.

A slice consists of an integer number of complete tiles or an integer number of consecutive complete CTU rows within a tile of a picture.

Two modes of slices are supported, namely the raster-scan slice mode and the rectangular slice mode. In the raster-scan slice mode, a slice contains a sequence of complete tiles in a tile raster scan of a picture. In the rectangular slice mode, a slice contains either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to that slice.

A subpicture contains one or more slices that collectively cover a rectangular region of a picture.

Figure 1:
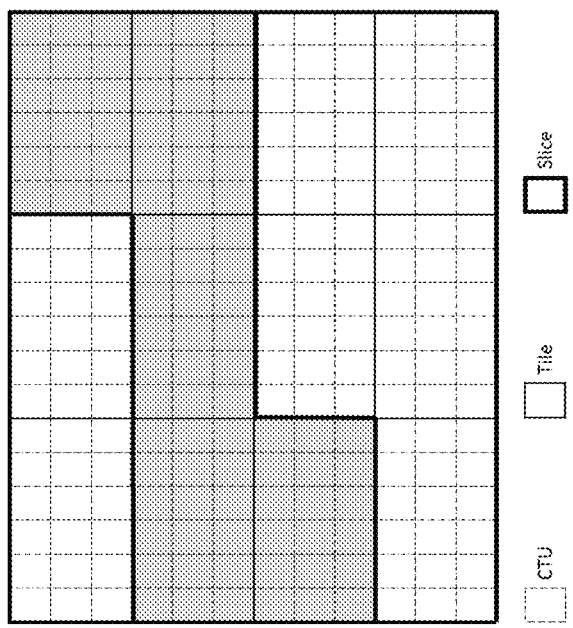
FIG. 1 shows an example of raster-scan slice partitioning of a picture, where the picture is divided into 12 tiles and 3 raster-scan slices.

FIG. 1 shows an example of raster-scan slice partitioning of a picture, where the picture is divided into 12 tiles and 3 raster-scan slices.

FIG. 2 shows an example of rectangular slice partitioning of a picture, where the picture is divided into 24 tiles (6 tile columns and 4 tile rows) and 9 rectangular slices.

Figure 3:
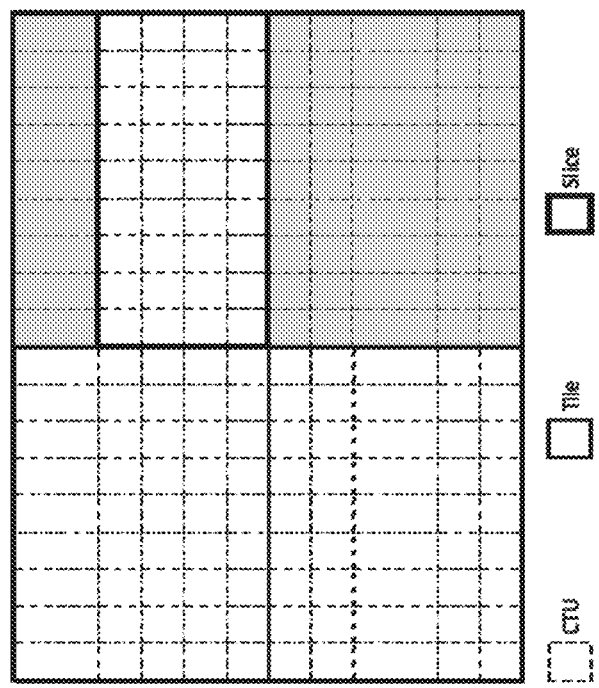
FIG. 3 shows an example of a picture partitioned into tiles and rectangular slices, where the picture is divided into 4 tiles (2 tile columns and 2 tile rows) and 4 rectangular slices.

FIG. 3 shows an example of a picture partitioned into tiles and rectangular slices, where the picture is divided into 4 tiles (2 tile columns and 2 tile rows) and 4 rectangular slices.

Figure 4:
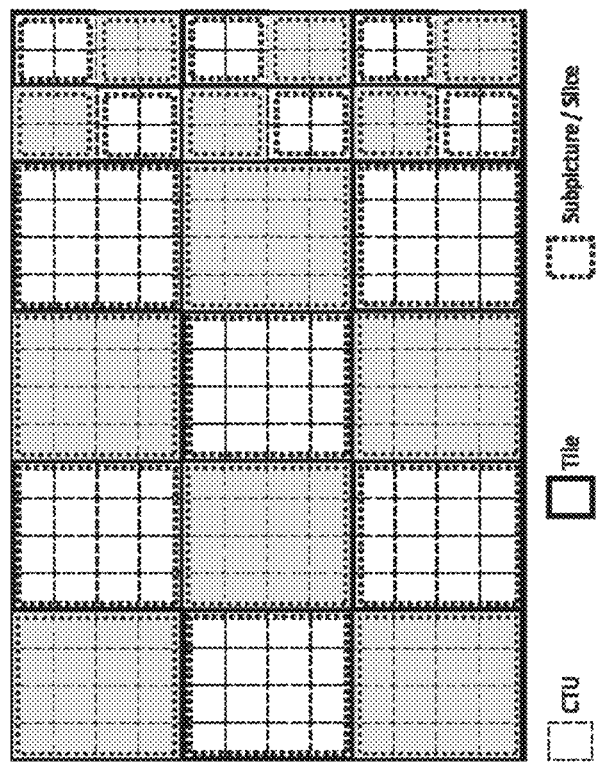
FIG. 4 shows a picture that is partitioned into 15 tiles, 24 slices and 24 subpictures.

FIG. 4 shows an example of subpicture partitioning of a picture, where a picture is partitioned into 18 tiles, 12 on the left-hand side each covering one slice of 4 by 4 CTUs and 6 tiles on the right-hand side each covering 2 vertically-stacked slices of 2 by 2 CTUs, altogether resulting in 24 slices and 24 subpictures of varying dimensions (each slice is a subpicture).

3.3. Picture Resolution Change within a Sequence

In AVC and HEVC, the spatial resolution of pictures cannot change unless a new sequence using a new SPS starts, with an intra random access (IRAP) picture. VVC enables picture resolution change within a sequence at a position without encoding an IRAP picture, which is always intra-coded. This feature is sometimes referred to as reference picture resampling (RPR), as the feature needs resampling of a reference picture used for inter prediction when that reference picture has a different resolution than the current picture being decoded.

The scaling ratio is restricted to be larger than or equal to ½ (2 times downsampling from the reference picture to the current picture), and less than or equal to 8 (8 times upsampling). Three sets of resampling filters with different frequency cutoffs are specified to handle various scaling ratios between a reference picture and the current picture. The three sets of resampling filters are applied respectively for the scaling ratio ranging from ½ to 1/1.75, from 1/1.75 to 1/1.25, and from 1/1.25 to 8. Each set of resampling filters has 16 phases for luma and 32 phases for chroma which is same to the case of motion compensation interpolation filters. Actually the normal MC interpolation process is a special case of the resampling process with scaling ratio ranging from 1/1.25 to 8. The horizontal and vertical scaling ratios are derived based on picture width and height, and the left, right, top and bottom scaling offsets specified for the reference picture and the current picture.

Other aspects of the VVC design for support of this feature that are different from HEVC include: i) The picture resolution and the corresponding conformance window are signaled in the PPS instead of in the SPS, while in the SPS the maximum picture resolution is signaled. ii) For a single-layer bitstream, each picture store (a slot in the DPB for storage of one decoded picture) occupies the buffer size as required for storing a decoded picture having the maximum picture resolution.

3.4. Reference Picture Management and Reference Picture Lists (RPLs)

Reference picture management is a core functionality that is necessary for any video coding scheme that uses inter prediction. It manages the storage and removal of reference pictures into and from a decoded picture buffer (DPB) and puts reference pictures in their proper order in the RPLs.

The reference picture management of HEVC, including reference picture marking and removal from the decoded picture buffer (DPB) as well as reference picture list construction (RPLC), differs from that of AVC. Instead of the reference picture marking mechanism based on a sliding window plus adaptive memory management control operation (MMCO) in AVC, HEVC specifies a reference picture management and marking mechanism based on so-called reference picture set (RPS), and the RPLC is consequently based on the RPS mechanism. An RPS consists of a set of reference pictures associated with a picture, consisting of all reference pictures that are prior to the associated picture in decoding order, that may be used for inter prediction of the associated picture or any picture following the associated picture in decoding order. The reference picture set consists of five lists of reference pictures. The first three lists contain all reference pictures that may be used in inter prediction of the current picture and that may be used in inter prediction of one or more of the pictures following the current picture in decoding order. The other two lists consist of all reference pictures that are not used in inter prediction of the current picture but may be used in inter prediction of one or more of the pictures following the current picture in decoding order. RPS provides an "intra-coded" signaling of the DPB status, instead of an "inter-coded" signaling as in AVC, mainly for improved error resilience. The RPLC process in HEVC is based on the RPS, by signaling an index to an RPS subset for each reference index; this process is simpler than the RPLC process in AVC.

Reference picture management in VVC is more similar to HEVC than AVC, but is somewhat simpler and more robust. As in those standards, two RPLs, list 0 and list 1, are derived, but they are not based on the reference picture set concept used in HEVC or the automatic sliding window process used in AVC; instead they are signaled more directly. Reference pictures are listed for the RPLs as either active and inactive entries, and only the active entries may be used as reference indices in inter prediction of CTUs of the current picture. Inactive entries indicate other pictures to be held in the DPB for referencing by other pictures that arrive later in the bitstream.

3.5. Parameter Sets

AVC, HEVC, and VVC specify parameter sets. The types of parameter sets include SPS, PPS, APS, and VPS. SPS and PPS are supported in all of AVC, HEVC, and VVC. VPS was introduced since HEVC and is included in both HEVC and VVC. APS was not included in AVC or HEVC but is included in the latest VVC draft text.

SPS was designed to carry sequence-level header information, and PPS was designed to carry infrequently changing picture-level header information. With SPS and PPS, infrequently changing information need not to be repeated for each sequence or picture, hence redundant signaling of this information can be avoided. Furthermore, the use of SPS and PPS enables out-of-band transmission of the important header information, thus not only avoiding the need for redundant transmissions but also improving error resilience.

VPS was introduced for carrying sequence-level header information that is common for all layers in multi-layer bitstreams.

APS was introduced for carrying such picture-level or slice-level information that needs quite some bits to code, can be shared by multiple pictures, and in a sequence there can be quite many different variations.

3.6. Slice Header and Picture Header in VVC

Similarly as in HEVC, the slice header in VVC conveys information for a particular slice. This includes slice address, slice type, slice QP, picture order count (POC) least significant bits (LSBs), RPS and RPL information, weighted prediction parameters, loop filtering parameters, entry offsets of tiles and WPP, etc.

VVC introduced the picture header (PH), which contains header parameters for a particular picture. Each picture must have one or only one PH. The PH basically carries those parameters that would have been in the slice header if PH were not introduced but each has the same value for all slices of a picture. These include IRAP/gradual decoding refresh (GDR) picture indications, inter/intra slices allowed flags, POC LSB and optionally POC most significant bit (MSB), information on RPLs, deblocking, SAO, ALF, QP delta, and weighted prediction, coding block partitioning information, virtual boundaries, co-located picture information, etc. It often occurs that each picture in an entire sequence of pictures contains only one slice. To allow not to have at least two NAL units for each picture in such cases, the PH syntax structure is allowed to be included either the PH NAL unit or in the slice header.

In VVC, information on the collocated picture, which is used for temporal motion vector prediction, is signaled either in the picture header or the slice header.

3.7. In Loop Filtering

In VVC, the deblocking filter, SAO, and ALF are supported as in-loop filtering methods.

3.7.1. SAO

The same design as in HEVC is used wherein the sample adaptive offset (SAO) is invoked after deblocking filter and before ALF, if needed. The key idea of SAO is to reduce sample distortion by first classifying reconstructed samples into different categories, obtaining an offset for each category, and then adding the offset to each sample of the category. The offset of each category is properly calculated at the encoder and explicitly signaled to the decoder for reducing sample distortion effectively, while the classification of each sample is performed at both the encoder and the decoder for saving side information significantly. To achieve low latency of only one coding tree unit (CTU), a CTU-based syntax design is specified to adapt SAO parameters for each CTU.

3.7.2. Adaptive Loop Filter (ALF)

Figure 11:
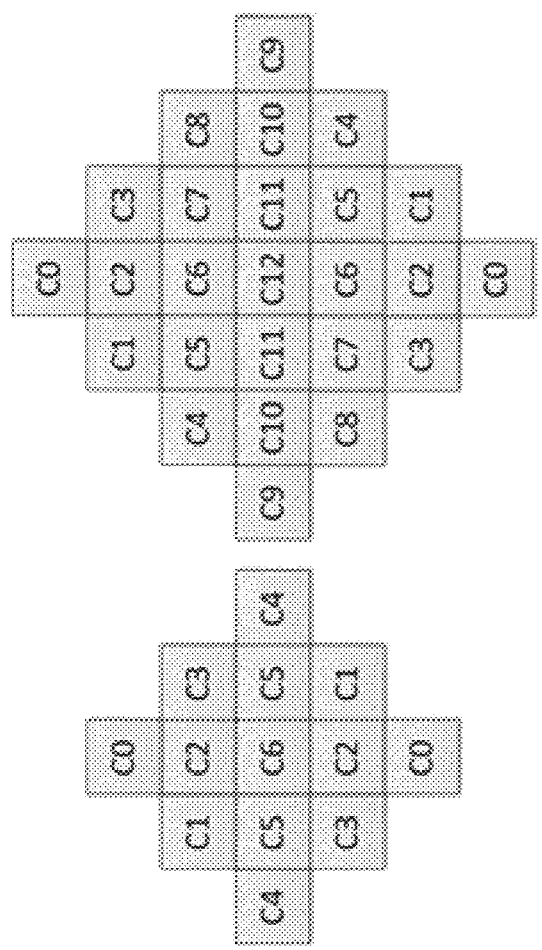
FIG. 11 shows an example of ALF filter shapes (chroma: 5×5 diamond, luma: 7×7 diamond).

Two diamond filter shapes (as shown in FIG. 11) are used in block-based ALF. The 7×7 diamond shape is applied for luma component and the 5×5 diamond shape is applied for chroma components. One among up to 25 filters is selected for each 4×4 block, based on the direction and activity of local gradients. Each 4×4 block in the picture is classified based on directionality and activity. Before filtering each 4×4 block, simple geometric transformations such as rotation or diagonal and vertical flip can be applied to the filter coefficients depending on gradient values calculated for that block. This is equivalent to applying these transformations to the samples in the filter support region. The idea is to make different blocks to which ALF is applied more similar by aligning their directionality. Block-based classification is not applied to the chroma components.

ALF filter parameters are signaled in the adaptation parameter set (APS). In one APS, up to 25 sets of luma filter coefficients and clipping value indices, and up to eight sets of chroma filter coefficients and clipping value indices could be signaled. To reduce bits overhead, filter coefficients of different classification for luma component can be merged. In the picture or slice header, the IDs of up to 7 APSs can be signaled to specify the luma filter sets that are used for the current picture or slice. The filtering process is further controlled at CTB level. A luma CTB can choose a filter set among 16 fixed filter sets and the filter sets signaled in APSs. For the chroma components, an APS ID is signaled in picture or slice header to indicate the chroma filter sets being used for the current picture or slice. At CTB level, a filter index is signaled for each chroma CTB if there is more than one chroma filter set in the APS. When ALF is enabled for a CTB, for each sample within the CTB, the diamond shape filter with the signaled weights is performed, with a clipping operation applied to clap the difference between the neighbor sample and the current sample. The clipping operation introduces non-linearity to make ALF more efficient by reducing the impact of neighbor sample values that are too different with the current sample value.

Figure 12:
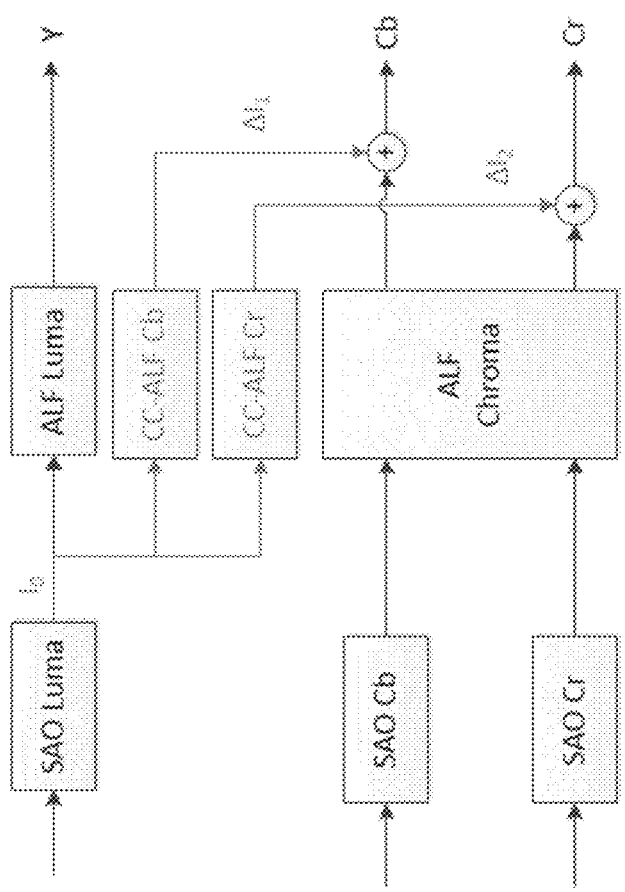
FIG. 12 shows an example of ALF and CC-ALF.

Cross-Component Adaptive Loop Filter (CC-ALF) can further enhance each chroma component on top of the previously described ALF. The goal of CC-ALF is to use luma sample values to refine each chroma component. This is achieved by applying an applying a diamond-shaped high-pass linear filter and then using the output of this filtering operation for the chroma refinement. FIG. 12 provides a system level diagram of the CC-ALF process with respect to the other loop filters. As shown in FIG. 12, the CC-ALF using the same inputs as the luma ALF to avoid additional step of the whole loop-filter process.

3.7.3. Signaling of ALF/SAO

In VVC draft 8, ALF and SAO share the same high-level control scheme. Both two coding tools can be controlled at sequence level and one of picture level or slice level (but not at both picture and slice level). First, a SPS enabled flag is signaled to control ALF/SAO at CLVS level. At PPS level, a PPS flag is signaled to indicate whether ALF/SAO is further controlled in picture level or slice level. If the PPS flag indicates ALF/SAO is further controlled in picture level, a PH ALF/SAO enabled flag is signaled followed by ALF parameters (if it is enabled); if the PPS flag indicates ALF/SAO is further controlled in slice level, a SH ALF/SAO enabled flag is signaled followed by ALF parameters (if it is enabled).

TABLE 1

ALF syntax in SPS

| | Descriptor |
|---|---|
| seq_parameter_set_rbsp( ) { | |
| ... | |
|   sps_alf_enabled_flag | u(1) |
|   if( sps_alf_enabled_flag && ChromaArrayType != 0 ) | |
|     sps_ccalf_enabled_flag | u(1) |

TABLE 2

ALF syntax in PPS

| | Descriptor |
|---|---|
| pic_parameter_set_rbsp( ) { | |
| ... | |
|   alf_info_in_ph_flag | u(1) |

TABLE 3

ALF syntax in the picture header

| | Descriptor |
|---|---|
| picture_header_structure( ) { | |
|   if( sps_alf_enabled_flag && alf_info_in_ph_flag ) { | |
|     ph_alf_enabled_flag | u(1) |
|     if( ph_alf_enabled_flag ) { | |
|       ph_num_alf_aps_ids_luma | u(3) |
|       for( i = 0; i < ph_num_alf_aps_ids_luma; i++ ) | |
|         ph_alf_aps_id_luma[ i ] | u(3) |
|       if( ChromaArrayType != 0 ) | |
|         ph_alf_chroma_idc | u(2) |
|       if( ph_alf_chroma_idc ) | |
|         ph_alf_aps_id_chroma | u(3) |
|       if( sps_ccalf_enabled_flag ) { | |
|         ph_cc_alf_cb_enabled_flag | u(1) |
|         if( ph_cc_alf_cb_enabled_flag ) | |
|           ph_cc_alf_cb_aps_id | u(3) |
|         ph_cc_alf_cr_enabled_flag | u(1) |
|         if( ph_cc_alf_cr_enabled_flag ) | |
|           ph_cc_alf_cr_aps_id | u(3) |
|       } | |
|     } | |
|   } | |
| } | |

TABLE 4

ALF syntax in the slice header

| | Descriptor |
|---|---|
| slice_header( ) { | |
| ... | |
|   if( sps_alf_enabled_flag && !alf_info_in_ph_flag ) { | |
|     slice_alf_enabled_flag | u(1) |
|     if( slice_alf_enabled_flag ) { | |
|       slice_num_alf_aps_ids_luma | u(3) |
|       for( i = 0; i < slice_num_alf_aps_ids_luma; i++ ) | |
|         slice_alf_aps_id_luma[ i ] | u(3) |
|       if( ChromaArrayType != 0 ) | |
|         slice_alf_chroma_idc | u(2) |
|       if( slice_alf_chroma_idc ) | |
|         slice_alf_aps_id_chroma | u(3) |
|       if( sps_ccalf_enabled_flag ) { | |
|         slice_cc_alf_cb_enabled_flag | u(1) |
|         if( slice_cc_alf_cb_enabled_flag ) | |
|           slice_cc_alf_cb_aps_id | u(3) |
|         slice_cc_alf_cr_enabled_flag | u(1) |
|         if( slice_cc_alf_cr_enabled_flag ) | |
|           slice_cc_alf_cr_aps_id | u(3) |
|       } | |
|     } | |
|   } | |
| } | |

TABLE 5

SAO syntax in SPS

| | Descriptor |
|---|---|
| seq_parameter_set_rbsp( ) { | |
| ... | |
|   sps_sao_enabled_flag | u(1) |

TABLE 6

SAO syntax in PPS

| | Descriptor |
|---|---|
| pic_parameter_set_rbsp( ) { | |
| ... | |
|   sao_info_in_ph_flag | u(1) |

TABLE 7

SAO syntax in the picture header

| | Descriptor |
|---|---|
| picture_header_structure( ) { | |
| ... | |
|   if( sps_sao_enabled_flag && sao_info_in_ph_flag ) { | |
|     ph_sao_luma_enabled_flag | u(1) |
|     if( ChromaArrayType != 0 ) | |
|       ph_sao_chroma_enabled_flag | u(1) |
|   } | |

TABLE 8

SAO syntax in the slice header

| | Descriptor |
|---|---|
| slice_header( ) { | |
| ... | |
|   if( sps_sao_enabled_flag && !sao_info_in_ph_flag ) { | |
|     slice_sao_luma_flag | u(1) |

TABLE 8-continued

SAO syntax in the slice header

| | Descriptor |
|---|---|
| if( ChromaArrayType != 0 ) | |
|   slice_sao_chroma_flag | u(1) |
| } | |

TABLE 9

LMCS syntax in SPS

| | Descriptor |
|---|---|
| seq_parameter_set_rbsp( ) { | |
| ... | |
|   sps_lmcs_enabled_flag | u(1) |

TABLE 10

LMCS syntax in the picture header

| | Descriptor |
|---|---|
| picture_header_structure( ) { | |
| ... | |
|   if( sps_lmcs_enabled_flag ) { | |
|     ph_lmcs_enabled_flag | u(1) |
|     if( ph_lmcs_enabled_flag ) { | |
|       ph_lmcs_aps_id | u(2) |
|       if( ChromaArrayType != 0 ) | |
|         ph_chroma_residual_scale_flag | u(1) |
|     } | |
|   } | |

TABLE 11

LMCS syntax in the slice header

| | Descriptor |
|---|---|
| slice_header( ) { | |
| ... | |
|   if( ph_lmcs_enabled_flag ) | |
|     slice_lmcs_enabled_flag | u(1) | sps_lmcs_enabled_flag equal to 1 specifies that luma mapping with chroma scaling is used in the CLVS. sps_lmcs_enabled_flag equal to 0 specifics that luma mapping with chroma scaling is not used in the CLVS. sps_sao_enabled_flag equal to 1 specifies that the sample adaptive offset process is applied to the reconstructed picture after the deblocking filter process. sps_sao_enabled_flag equal to 0 specifies that the sample adaptive offset process is not applied to the reconstructed picture after the deblocking filter process.

3.8. Luma Mapping with Chroma Scaling (LMCS)

Unlike other in-loop filters (i.e., deblocking, SAO, and ALF), which in general apply filtering processes for a current sample by using the information of its spatial neighboring samples to reduce the coding artifacts, the luma mapping with chroma scaling (LMCS) modifies the input signal before encoding by redistributing the codewords across the entire dynamic range to improve compression efficiency. LMCS has two main components: (a) in-loop mapping of the luma component based on adaptive piecewise linear models, and (b) luma-dependent chroma residual scaling for the chroma components. Luma mapping makes use of a forward mapping function, FwdMap, and a corresponding inverse mapping function, InvMap. The FwdMap function is signaled using a piecewise linear model with 16 equal pieces. InvMap function does not need to be signaled and is instead derived from the FwdMap function. The luma mapping model is signaled in the APS. Up to 4 LMCS APSs can be used in a coded video sequence. When LMCS is enabled for a picture, an APS ID is signaled in the picture header to identify the APS that carries the luma mapping parameters. When LMCS is enabled for a slice, the InvMap function is applied to all the reconstructed luma blocks to convert the samples back to the original domain. For an inter coded block, an additional mapping process is needed, which is applying the FwdMap function to map the luma prediction block in the original domain to the mapped domain after the normal compensation process. Chroma residual scaling is designed to compensate for the interaction between the luma signal and its corresponding chroma signals. When luma mapping is enabled, an additional flag is signaled to indicate whether luma-dependent chroma residual scaling is enabled or not. The chroma residual scaling factor depends on the average value of top and/or left reconstructed neighboring luma samples of the current coding unit (CU). Once the scaling factor is determined, the forward scaling is applied to both the intra and inter predicted residual at the encoding stage, and the inverse scaling is applied to the reconstructed residual.

3.8.1. Signaling of LMCS Related Syntax Elements

In current VVC specification, the LMCS control could be signaled in SPS, PH and SH. First, an SPS enabled flag controls LMCS at CLVS level. If the SPS enabled flag is equal to 1, a PH enabled flag is further signaled to control LMCS at picture level, and if it is enabled in picture level, the LMCS parameter information is signaled in PH as well. If PH enabled flag is equal to 1, a SH enabled flag is further signaled to control LMCS at slice level but LMCS parameter information cannot be signaled in SH even if it is enabled in slice level.

The related syntax elements and semantics are as follows:

7.3.2.7 Picture Header Structure Syntax

| | Descriptor |
|---|---|
| picture_header_structure( ) { | |
| ... | |
|   if( sps_lmcs_enabled_flag ) { | |
|     ph_lmcs_enabled_flag | u(1) |
|     if( ph_lmcs_enabled_flag ) { | |
|       ph_lmcs_aps_id | u(2) |
|       if( ChromaArrayType != 0 ) | |
|         ph_chroma_residual_scale_flag | u(1) |
|     } | |
| ... | |
|   } | |
| ... | |

7.3.7.1 General Slice Header Syntax

| | Descriptor |
|---|---|
| slice_header( ) { | |
| ... | |
|   if( ph_lmcs_enabled_flag ) | |
|     slice_lmcs_enabled_flag | u(1) |
| ... | | ph_lmcs_enabled_flag equal to 1 specifies that luma mapping with chroma scaling is enabled for all slices associated with the PH. ph_lmcs_enabled_flag equal to 0 specifies that luma mapping with chroma scaling may be disabled for one, or more, or all slices associated with the PH. When not present, the value of ph_lmcs_enabled_flag is inferred to be equal to 0.

ph_chroma_residual_scale_flag equal to 1 specifies that chroma residual scaling is enabled for the all slices associated with the PH. ph_chroma_residual_scale_flag equal to 0 specifies that chroma residual scaling may be disabled for one, or more, or all slices associated with the PH. When ph_chroma_residual_scale_flag is not present, it is inferred to be equal to 0.

slice_lmcs_enabled_flag equal to 1 specifies that luma mapping with chroma scaling is enabled for the current slice. slice_lmcs_enabled_flag equal to 0 specifies that luma mapping with chroma scaling is not enabled for the current slice. When slice_lmcs_enabled_flag is not present, it is inferred to be equal to 0.

3.9. Explicit Scaling List

Explicit signalling of scaling list is defined in the APS. And for each picture, whether using the explicit signalling is firstly signalled as a flag in PH, followed by the APS index, if needed. In the slice header, when the PH flag tells explicit scaling list is used, each slice further signal a flag to indicate whether current slice use the explicit signalling or not.

Most relevant texts for scaling lists in the current VVC draft text are as follows:

Sequence Parameter Set RBSP Syntax and Semantics

|  | Descriptor |
| --- | --- |
| seq_parameter_set_rbsp( ) { | |
| ... | |
| sps_scaling_list_enabled_flag | u(1) |
| } | |

. . .

sps_scaling_list_enabled_flag equal to 1 specifies that a scaling list is used for the scaling process for transform coefficients. sps_scaling_list_enabled_flag equal to 0 specifies that scaling list is not used for the scaling process for transform coefficients.

Picture Header Structure Syntax and Semantics

|  | Descriptor |
| --- | --- |
| picture_header_structure( ) { | |
| ... | |
| if( sps_scaling_list_enabled_flag ) { | |
| ph_scaling_list_present_flag | u(1) |
| if( ph_scaling_list_present_flag ) | |
| ph_scaling_list_aps_id | u(3) |
| } | |
| ... | |
| } | |

. . .

ph_scaling_list_present_flag equal to 1 specifies that the scaling list data used for the slices associated with the PH is derived based on the scaling list data contained in the referenced scaling list APS. ph_scaling_list_present_flag equal to 0 specifies that the scaling list data used for the slices associated with the PH is set to be equal to 16. When not present, the value of ph_scaling_list_present_flag is inferred to be equal to 0. When not present, the value of ph_scaling_list_present_flag is inferred to be equal to 0.

ph_scaling_list_aps_id specifies the adaptation_parameter_set_id of the scaling list APS. The TemporalId of the APS NAL unit having aps_params_type equal to SCALING_APS and adaptation_parameter_set_id equal to ph_scaling_list_aps_id shall be less than or equal to the TemporalId of the picture associated with PH.

. . .

General Slice Header Syntax and Semantics

|  | Descriptor |
| --- | --- |
| slice_header( ) { | |
| ... | |
| if( pic_scaling_list_enabled_flag ) | |
| slice_scaling_list_present_flag | u(1) |
| ... | |
| } | |

. . .

slice_scaling_list_present_flag equal to 1 specifies that the scaling list data used for the current slice is derived based on the scaling list data contained in the referenced scaling list APS with aps_params_type equal to SCALING_APS and adaptation_parameter_set_id equal to ph_scaling_list_aps_id. slice_scaling_list_present_flag equal to 0 specifies that the scaling list data used for the current picture is the default scaling list data derived specified in clause 7.4.3.21. When not present, the value of slice_scaling_list_present_flag is inferred to be equal to 0.

. . .

Scaling Process for Transform Coefficients

For the derivation of the scaled transform coefficients d[x][y] with x=0 . . . nTbW−1, y=0 . . . nTbH−1, the following applies:

The intermediate scaling factor m[x][y] is derived as follows:

If one or more of the following conditions are true, m[x][y] is set equal to 16:

sps_scaling_list_enabled_flag is equal to 0.

ph_scaling_list_present_flag is equal to 0.

transform_skip_flag[xTbY][yTbY][cIdx] is equal to 1.

scaling_matrix_for_lfnst_disabled_flag is equal to 1 and ApplyLfirstFlag is equal to 1.

. . .

. . .

7.3.2.5 Adaptation Parameter Set RBSP Syntax

|  | Descriptor |
| --- | --- |
| adaptation_parameter_set_rbsp( ) { | |
| adaptation_parameter_set_id | u(5) |
| aps_params_type | u(3) |
| if( aps_params_type = = ALF_APS ) | |
| alf_data( ) | |
| else if( aps_params_type = = LMCS_APS ) | |
| lmcs_data( ) | |
| else if( aps_params_type = = SCALING_APS ) | |
| scaling_list_data( ) | |
| aps_extension_flag | u(1) |
| if( aps_extension_flag ) | |
| while( more_rbsp_data( ) ) | |
| aps_extension_data_flag | u(1) |
| rbsp_trailing_bits( ) | |
| } | |

7.3.2.21 Scaling List Data Syntax

| | Descriptor |
|---|---|
| scaling_list_data( ) { | |
|   scaling_matrix_for_lfnst_disabled_flag | u(1) |
|   scaling_list_chroma_present_flag | u(1) |
|   for( id = 0; id < 28; id ++ ) | |
|     matrixSize = (id < 2 ) ? 2 : ( ( id < 8 ) ? 4 : 8 ) | |
|     if( scaling_list_chroma_present_flag \|\| ( id % 3 = = 2 ) \|\| ( id = = 27 ) ) { | |
|       scaling_list_copy_mode_flag[ id ] | u(1) |
|       if( !scaling_list_copy_mode_flag[ id ] ) | |
|         scaling_list_pred_mode_flag[ id ] | u(1) |
|       if( ( scaling_list_copy_mode_flag[ id ] \|\| scaling_list_pred_mode_flag[ id ] ) | |
|       && | |
|         id != 0 && id != 2 && id != 8 ) | |
|         scaling_list_pred_id_delta[ id ] | ue(v) |
|       if( !scaling_list_copy_mode_flag[ id ] ) { | |
|         nextCoef = 0 | |
|         if( id > 13 ) { | |
|           scaling_list_dc_coef[ id − 14 ] | se(v) |
|           nextCoef += scaling_list_dc_coef[ id − 14 ] | |
|         } | |
|         for( i = 0; i < matrixSize * matrixSize; i++ ) { | |
|           x = DiagScanOrder[ 3 ][ 3 ][ i ][ 0 ] | |
|           y = DiagScanOrder[ 3 ][ 3 ][ i ][ 1 ] | |
|           if( !( id > 25 && x >= 4 && y >= 4 ) ) { | |
|             scaling_list_delta_coef[ id ][ i ] | se(v) |
|             nextCoef += scaling_list_delta_coef[ id ][ i ] | |
|           } | |
|           ScalingList[ id ][ i ] = nextCoef | |
|         } | |
|       } | |
|     } | |
|   } | |
| } | | scaling_matrix_for_lfnst_disabled_flag equal to 1 specifies that scaling matrices are not applied to blocks coded with low-frequency non-separable transform (LFNST). scaling_matrix_for_lfnst_disabled_flag equal to 0 specifies that the scaling matrices may apply to the blocks coded with LFNST.

3.10. Recent Progress to LMCS, and Explicit Scaling List

To resolve all the above issues, it is proposed to replace the PH flag ph_lmcs_enabled_flag with a 2-bit ph_lmcs_mode_idc, with 3 modes specified: disabled (mode 0), used for all slices (mode 1), and enabled (mode 2). In mode 1, the LMCS is used for all slices of a picture, and no signalling of LMCS control flag is needed in the SH. The semantics of the SH LMCS control flag is revised accordingly. In addition, fixes of the semantics of ph_chroma_residual_scale_flag are proposed to reflect the intention of enabling/disabling chroma residual scaling for a picture or slice.

Below are some proposed changes to the syntax structures. Most relevant parts that have been added or modified are in boldface, and some of the deleted parts are indicated using [[ ]].

7.3.2.7 Picture Header Structure Syntax

| | Descriptor |
|---|---|
| picture_header_structure( ) { | |
|   ... | |
|   if( sps_lmcs_enabled_flag ) { | |
|     [[ph_lmcs_enabled_flag]] | [[u(1)]] |
|     if( [[ph_lmcs_enabled_flag]] | |

-continued

| | Descriptor |
|---|---|
|     { | |
|       ph_lmcs_aps_id | u(2) |
|       if( ChromaArrayType != 0 ) | |
|         ph_chroma_residual_scale_flag | u(1) |
|     } | |
|   ... | |
| } | |

7.3.7.1 General Slice Header Syntax

| | Descriptor |
|---|---|
| slice_header( ) { | |
|   ... | |
|   if([[ph_lmcs_enabled flag]] | |
|     slice_lmcs flag[[enabled_flag]] | u(1) |
|   ... | |
| } | | ph_lmcs_mode_idc[[enabled_flag]] equal to 1 specifies that luma mapping with chroma scaling is applied for all slices associated with the PH. ph_lmcs_mode_idc equal to 2 specifies that luma mapping with chroma scaling is enabled for the current picture and whether it is applied for each slice is further controlled by the slice_lmcs_used_flag signalled in the slice header. ph_lmcs_mode_idc[[enabled_flag]] equal to 0 specifies that luma mapping with chroma scaling [[may be disabled for one, or more, or]] is disabled for all slices associated with the PH. The value of ph_lmcs_mode_idc shall be less than 3. When not present, the value of ph_lmcs_mode_idc[[enabled_flag]] is inferred to be equal to 0.

ph_chroma_residual_scale_flag equal to 1 specifies that chroma residual scaling is enabled for all slices associated with the PH and whether it is applied for each slice is further controlled by the slice_lmcs_used_flag signalled in the slice header. ph_chroma_residual_scale_flag equal to 0 specifies that chroma residual scaling [[may be disabled for one, or more, or]] is disabled for all slices associated with the PH. When ph_chroma_residual_scale_flag is not present, it is inferred to be equal to 0.

. . .

slice_lmcs_used_flag[[enabled_flag]] equal to 1 specifies that luma mapping with chroma scaling is applied for the current slice, and, when ph_chroma_residual_scale_flag is equal to 1, chroma residual scaling is also applied for the current slice. slice_lmcs_used_flag[[enabled_flag]] equal to 0 specifies that luma mapping with chroma scaling as well as chroma residual scaling is not applied for the current slice. When slice_lmcs_used_flag[[enabled_flag]] is not present, it is inferred to be equal to [[0]] (ph_lmcs_mode_idc==1)? 1:0.

. . .

The following changes are proposed to address several issues:
(1) The PH flag ph_explicit_scaling_list_enabled_flag is replaced with a 2-bit ph_explicit_scaling_list_mode_idc, with 3 modes specified: disabled (mode 0), used for all slices (mode 1), and enabled (mode 2). In mode 1, the explicit scaling list is used for all slices of a picture, and no scaling list signalling is needed in the SH.
(2) Move the flag scaling_matrix_for_lfnst_disabled_flag from the scaling_list_data( ) syntax to the SPS.

7.3.2.3 Sequence Parameter Set RBSP Syntax

|  | Descriptor |
|---|---|
| seq_parameter_set_rbsp( ) { | |
| ... | |
| sps_lfnst_enabled_flag | u(1) |
| ... | |
| sps_explicit_scaling_list_enabled_flag | u(1) |
| | |
| ... | |
| } | |

7.4.3.3 Sequence Parameter Set RBSP Semantics
sps_lfnst_enabled_flag equal to 1 specifies that lfnst_idx may be present in intra coding unit syntax. sps_lfnst_enabled_flag equal to 0 specifies that lfst_idx is not present in intra coding unit syntax.
sps_explicit_scaling_list_enabled_flag equal to 1 specifies that the use of an explicit scaling list, which is signalled in a scaling list APS, in the scaling process for transform coefficients when decoding a slice is enabled for the CLVS. sps_explicit_scaling_list_enabled_flag equal to 0 specifies that the use of an explicit scaling list in the scaling process for transform coefficients when decoding a slice is disabled for the CLVS.
scaling_matrix_for_lfnst_disabled_flag equal to 1 specifies that scaling matrices are not applied to blocks coded with LFNST. scaling_matrix_for_lfnst_disabled_flag equal to 0 specifies that the scaling matrices may be applied to the blocks coded with LFNST. When not present, the value of scaling_matrix_for_lfnst_disabled_flag is inferred to be equal to 1.

7.3.2.7 Picture Header Structure Syntax

|  | Descriptor |
|---|---|
| picture_header_structure( ) { | |
| ... | |
| if( sps_explicit_scaling_list_enabled_flag ) { | |
| [[ph_explicit_scaling_list_enabled flag | u(1) |
| if( ph_explicit_scaling_list_enabled_flag )]] | |
| | |
| ph_scaling_list_aps_id | u(3) |
| } | |
| } | |

7.4.3.7 Picture Header Structure Semantics
[[ph_explicit_list_enabled_flag equal to 1 specifies that the use of the explicit scaling list, which is signalled in the referenced scaling list APS (i.e., the APS with aps_params_type equal to SCALING_APS and adaption_parameter_set_id equal to ph_explicit_scaling_list_aps_id), in the scaling process for transform coefficients when decoding a slice is enabled for the picture. ph_explicit_scaling_list_enabled_flag equals to 0 specifies that the use of an explicit scaling list in the scaling process for transform coefficients when decoding a slice is disabled for the picture. When no present, the value of ph_explicit_scaling_list_enabled_flag is inferred to be equal to 0.]]
ph_explicit_scaling_list_mode_idc equal to 0 specifies that use of an explicit scaling list in the scaling process for transform coefficients when decoding a slice is disabled for the picture. ph_explicit_scaling_list_mode_ldc equal to 1 specifies that the explicit scaling list, which is signalled in the referenced scaling list APS (i.e., the APS with aps_params_type equal to SCALING_APS and adaptation_parameter_set_id equal to ph_explicit_scaling_list_aps_id), is used in the scaling process for transform coefficients when decoding all slices in the picture. ph_explicit_scaling_list_mode_idc equal to 2 specifies that use of the explicit scaling list in the scaling process for transform coefficients when decoding a slice is enabled for the picture. The value of ph_explicit_scaling_list_mode_idc shall be less than 3. When not present, the value of ph_expHcit_scaling_mode_idc is inferred to be equal to 0.
ph_scaling_list_aps_id specifies the adaptation_parameter_set_id of the scaling list APS. The TemporalId of the APS NAL unit having aps_params_type equal to SCALING_APS and adaptation_parameter_set_id equal to ph_scaling_list_aps_id shall be less than or equal to the TemporalId of the picture associated with PH.

7.3.2.21 Scaling List Data Syntax

|  | Descriptor |
|---|---|
| scaling_list_data( ) { | |
| [[scaling_matrix_for_lfnst_disabled_flag | u(1)]] |
| scaling_list_chroma_present_flag | u(1) |
| ... | |
| } | |

7.4.3.21 Scaling List Data Semantics
[[scaling_matrix_for_lfnst_disabled_flag equal to 1 specifies that scaling matrices are not applied to blocks coded with LFNST. scaling_matrix_for_lfirst_disabled_flag equal to 0 specifies that the scaling matrices may apply to the blocks coded with LFNST.]]
scaling_list_chroma_present_flag equal to 1 specifies that chroma scaling lists are present in scaling_list_data( ). scaling_list_chroma_present_flag equal to 0 specifies that chroma scaling lists are not present in scaling_list_data( ). It is a requirement of bitstream conformance that scaling_list_chroma_present_flag shall be equal to 0 when ChromaArrayType is equal to 0, and shall be equal to 1 when ChromaArrayType is not equal to 0.

7.3.7.1 General Slice Header Syntax

|  | Descriptor |
|---|---|
| slice_header( ) { | |
| ... | |
| [[if( ph_explicit_scaling_list_enabled_flag )]] | |
|    slice_explicit_scaling_list_used_flag | u(1) |
| ... | |
| } | |

7.4.8.1 General Slice Header Semantics slice_explicit_scaling_list_used_flag equal to 1 specifies that the explicit scaling list, which is signalled in the referenced scaling list APS with aps_params_type equal to SCALING_APS and adaptation_parameter_set_id equal to ph_scaling_list_aps_id, is used in the scaling process for transform coefficients when decoding of the current slice. slice_explicit_scaling_list_used_flag equal to 0 specifies that no explicit scaling list is not used in the scaling process for transform coefficients when decoding of the current slice. When not present, the value of slice_explicit_scaling_list_used_flag is inferred to be equal to (ph_explicit_scaling_list_mode_idc==1)?1:0.

4. Examples of Technical Problems Addressed by Disclosed Technical Solutions

The existing designs and recent progresses of ALF, SAO, scaling list, and LMCS have the following problems:
1. The designs of scaling list/LMCS have addressed quite a few issues in the latest VVC text, however, the following issues are further identified:
   a. If one picture contains only one slice, the signalling of slice level control flag is not necessary.
   b. If one picture contains only one slice, then the allowed mode type (e.g., enabling for all slices; disabling for all slices; and enabling for at least one but not all slices) could be reduced to two modes instead of three.
2. SAO/ALF could be controlled in either PH or SH, but not both which limit the flexibility.
3. The semantics of sps_lmcs_enabled_flag and sps_sao_enabled_flag are not accurate, even when the SPS flag is true, each slice or block may select to apply LMCS/SAO or not.
4. The slice type in SH and/or allowed inter/intra/B slice type flag in PH are signalled without considering the case that one picture only contains one slice.

5. A Listing of Solutions and Embodiments

To solve the above problems, and others, methods as summarized below are disclosed. The items should be considered as examples to explain the general concepts and should not be interpreted in a narrow way. Furthermore, these items can be applied individually or combined in any manner.

Related to LMCS/Scaling List
1. The allowed LMCS and/or scaling list mode types (e.g., enabling for all slices; disabling for all slices; and enabling for at least one but not all slices) may be dependent on whether the PH syntax structure is present in the slice header (or whether current picture only contains one slice).
   a. In one example, only two mode types are allowed when the PH syntax structure is present in the slice header (or whether current picture only contains one slice).
   b. In one example, how to signal the mode types may depend on whether the PH syntax structure is present in the slice header (or whether current picture only contains one slice).
      i. Alternatively, when the PH syntax structure is present in the slice header (or whether current picture only contains one slice), the signalled mode type shall be 0 or 1 (or the signalled mode shall not be equal to one of the three modes).
2. Whether to signal the indicator of using/enabling LMCS for a lower level (e.g., a slice/tile/subpicture) is dependent on a non-binary LMCS related syntax element (e.g., the LMCS mode index) signalled in the higher level (e.g., a picture, in PH/PPS) and whether the PH syntax structure is NOT present in the slice header (or whether current picture contains more than one slice or depending on pps_one_slice_per_picture_flag).
   a. In one example, whether to signal the lower level indictor may be based on the condition check on whether the following two conditions are both satisfied:
      i. The higher level non-binary LMCS related syntax element indicated that LMCS is enabled for at least one slice but not for all slices (or indicated that LMCS is enabled at the sequence level or picture level and whether LMCS is used for individual slices is controlled at slice level).
      ii. The current picture consists of more than one slice or pps_one_slice_per_picture_flag is false.
   b. In one example, signaling of the lower level indictor may be skipped if one or both of the following two conditions are true:
      i. The higher level non-binary LMCS related syntax element indicated that LMCS is enabled for all slices or disabled for all slices (or indicated that LMCS is either used by all slices or disabled for all slices).
      ii. The current picture consists only one slice.
   c. In one example, the condition check is modified from the following:

| if(ph_lmcs_mode_idc = = 2 ) | |
   |---|---|
   |   slice_lmcs_used_flag | u(1) | to the following:

| if(ph_lmcs_mode_idc = = 2 | |
   |---|---|
   |   slice_lmcs_used_flag | u(1) | d. In one example, the condition check is modified from the following:

| if(ph_lmcs_mode_idc = = 2 ) | |
   |---|---|
   |   slice_lmcs_used_flag | u(1) | to the following:

```
if(ph_lmcs_mode_idc == 2
   slice_lmcs_used_flag                    u(1)
``` e. Alternatively, furthermore, when the lower level indicator of LMCS (e.g., slice_lmcs_used_flag/slice_lmcs_enabled_flag) is not signalled, it is inferred according to the non-binary LMCS related syntax element.
  i. In one example, the non-binary LMCS related syntax element is the ph_lmcs_mode_idc.
  ii. Alternatively, furthermore, the inference of usage of slice-level LMCS (e.g., slice_lmcs_used_flag/slice_lmcs_enabled_flag) is (ph_lmcs_mode_idc==0?0:1)

3. Whether to signal the indicator of using/enabling explicit scaling list (ESL) for a lower level (e.g., a slice/tile/subpicture) is dependent on a non-binary LMCS related syntax element (e.g., the ESL mode index) signaled in the higher level (e.g., a picture, in PH/PPS) and whether PH syntax structure is NOT present in the slice header (or whether current picture contain more than one slice or depending on pps_one_slice_per_picture_flag).
  a. In one example, whether to signal the lower level indictor may be based on the condition check on whether the following two conditions are both satisfied:
    i. The higher level non-binary ESL related syntax element indicated that ESL is enabled for at least one slice but not for all slices (or indicated that ESL is enabled at the sequence level or picture level and whether ESL is used for individual slices is controlled at slice level).
    ii. The current picture consists of more than one slice or pps_one_slice_per_picture_flag is false.
  b. In one example, signaling of the lower level indictor may be skipped if both of the following two conditions are true:
    i. The higher level non-binary ESL related syntax element indicated ESL is enabled for all slices or disabled for all slices (or indicated that ESL is either used by all slices or disabled for all slices).
    ii. The current picture consists only one slice.
  c. In one example, the condition check is modified from the following:

```
if(ph_explicit_scaling_list_mode_idc == 2 )
   slice_explicit_scaling_list_used_flag       u(1)
``` to the following:

```
if(ph_lmcs_mode_idc == 2
   slice_explicit_scaling_list_used_flag       u(1)
``` d. In one example, the condition check is modified from the following:

```
if(ph_explicit_scaling_list_mode_idc == 2 )
   slice_explicit_scaling_list_used_flag       u(1)
``` to the following:

```
if(ph_lmcs_mode_idc == 2
   slice_explicit_scaling_list_used_flag       u(1)
``` e. Alternatively, furthermore, when the lower level indicator of ESL (e.g., slice_explicit_scaling_list_used_flag/slice_lmcs_enabled_flag) is not signalled, it is inferred according to the non-binary ESL related syntax element.
  i. In one example, the non-binary ESL related syntax element is the ph_lmcs_mode_idc.
  ii. Alternatively, furthermore, the inference of usage of slice-level ESL (e.g., slice_lmcs_used_flag/slice_lmcs_enabled_flag) is (ph_lmcs_mode_idc==0?0:1)

4. Semantics of LMCS SPS flag is modified as follows:
  sps_lmcs_enabled_flag equal to 1 specifies that luma mapping with chroma scaling is enabled [[used]] in the CLVS. sps_lmcs_enabled_flag equal to 0 specifies that luma mapping with chroma scaling is disabled [[not used]] in the CLVS. or as follows:
  sps_lmcs_enabled_flag equal to 1 specifies that luma mapping with chroma scaling is enabled and may be used for slices of pictures [[used]] in the CLVS. sps_lmcs_enabled_flag equal to 0 specifies that luma mapping with chroma scaling is disabled and are not used by slices of pictures [[not used]] in the CLVS.

Related to Indications of Slice Types

5. Whether to and/or how to signal the slice type (e.g., slice_type) in SH and/or the allowed inter/intra/B slice type flags (ph_inter_slice_allowed_flag, ph_intra_slice_allowed_flag, ph_b_slice_allowed_flag) in the PH may be dependent on whether the picture is only allowed to have one slice.
  a. In one example, whether the picture is only allowed to have one slice may be indicated by the pps_one_slice_per_picture_flag being true.
  b. In one example, whether the picture is only allowed to have one slice may be indicated by the PH syntax structure being present in the slice header.
  c. In one example, if only one slice per picture is allowed for current picture, then the followings may be further applied:
    i. ph_intra_slice_allowed_flag is not signalled if ph_inter_slice_allowed_flag is true
    ii. ph_intra_slice_allowed_flag is not signalled if ph_B_slice_allowed_flag is true
    iii. ph_b_slice_allowed_flag is not signalled if ph_intra_slice_allowed_flag is true
    iv. slice_type is not signalled and inferred.

Related to In-Loop Filtering Technology Denoted by TX (e.g., Deblocking Filter, ALF, SAO)

6. Semantics of SAO SPS flag is modified as follows:
  sps_sao_enabled_flag equal to 1 specifies that the sample adaptive offset process is enabled and may be applied [[applied]] to the reconstructed picture after the deblocking filter process for pictures in the CLVS. sps_sao_enabled_flag equal to 0 specifies that the sample adaptive offset process is disabled and not applied to the reconstructed picture after the deblocking filter process for pictures in the CLVS.

7. Indicator of an enabling mode type of the coding tool TX may be signaled in a first video unit level.
  a. In one example, the allowed mode types may include: enabling for all video sub-units; disabling for all video sub-units; enabling for at least one video sub-unit but not all video sub-units.
  i. In one example, the first video unit may be a picture.
  ii. In one example, the sub-video unit may be a slice/tile/subpicture.
b. The enabling mode type may be signalled in PH/PPS.
c. The allowed mode types may be dependent on whether PH syntax structure is present in the slice header (or whether current picture only contains one slice).
  i. In one example, only two mode types are allowed when the PH syntax structure is present in the slice header (or whether current picture only contains one slice or depending on pps_one_slice_per_picture_flag).
  ii. In one example, how to signal the mode types may depend on whether the PH syntax structure is present in the slice header (or whether current picture only contains one slice or depending on pps_one_slice_per_picture_flag).
    1. Alternatively, when the PH syntax structure is present in the slice header (or current picture only contains one slice or pps_one_slice_per_picture_flag is true), the signalled mode type shall be 0 or 1 (or the signalled mode shall not be equal to one of the three modes).
8. Whether to signal the indicator of using/enabling coding tool TX for a lower level (e.g., a slice/tile/subpicture) is dependent on whether PH syntax structure is NOT present in the slice header (or whether current picture contains more than one slice or depending on the value of pps_one_slice_per_picture_flag).
  b. In one example, if the current picture consists only one picture, or PH syntax structure is present in the slice header or pps_one_slice_per_picture_flag is true, signalling of the lower level indictor is skipped.
  c. Alternatively, furthermore, when the lower level indicator is not signalled, it is inferred to be the enabling/using value signalled in the higher level (e.g., in PH/PPS).
9. The usage of coding tool TX may be indicated in two level, and a two-level control of coding tool TX is introduced, wherein a higher-level control (e.g., a picture level) and a lower level (e.g., a slice level) control are used and how/whether the lower level control information is present is dependent on the high-level control information. In addition, the following applies:
  a. In a first example, one or more of the sub-bullets below is applied:
    i. A first non-binary-valued indicator (e.g., ph_TX_enabled_type) may be signaled at the higher level (e.g., in picture header (PH)) to specify how TX is enabled at lower level.
      1) In one example, when the first indicator is equal to X (e.g., X=1), it specifies that X is enabled for all slices associated with the PH; when the first indicator is equal to Y (Y !=X) (e.g., Y=2), it specifies that coding tool TX is enabled for one, or more, but not all slices associated with the PH; when the first indicator is equal to Z (Z!=X and Z!=Y) (e.g., Z=0), it specifies that coding tool TX is disabled for all slices associated with the PH.
        a) Alternatively, furthermore, when the first indicator is not present, the value of the indicator is inferred to be equal to a default value, such as Z.
        b) Alternatively, when the first indicator is equal to Y (Y !=X)(e.g., Y=1), it specifies that use of the coding tool TX in the scaling process for transform and/or non-transform coefficients when decoding a slice is enabled for the picture.
        c) Alternatively, when the first indicator is equal to Y (Y !=X)(e.g., Y=1), it specifies that use of the coding tool TX in the scaling process for transform and/or non-transform coefficients when decoding a slice may be enabled for the picture.
      2) In one example, when the first indicator is equal to X (e.g., X=2), it specifies that coding tool TX is disabled for all slices associated with the PH; when the first indicator is equal to Y (Y !=X) (e.g., Y=1), it specifies that coding tool TX is disabled for one, or more, but not all slices associated with the PH; when the first indicator is equal to Z (Z!=X and Z!=Y) (e.g., Z=0), it specifies that coding tool TX is enabled for all slices associated with the PH.
        a) Alternatively, furthermore, when the first indicator is not present, the value of the indicator is inferred to be equal to a default value, such as X.
        b) Alternatively, when the first indicator is equal to Y (Y !=X)(e.g., Y=1), it specifies that use of the coding tool TX in the scaling process for transform and/or non-transform coefficients when decoding a slice may be disabled for the picture.
        c) Alternatively, when the first indicator is equal to Y (Y !=X)(e.g., Y=1), it specifies that use of the coding tool TX in the scaling process for transform and/or non-transform coefficients when decoding a slice is disabled for the picture.
      3) Alternatively, furthermore, the first indicator may be conditionally signalled according to the value of the coding tool TX enabling flag in sequence level (e.g., sps_TX_enabled_flag).
      4) Alternatively, furthermore, the first indicator may be coded with u(v), or u(2) or ue(v).
      5) Alternatively, furthermore, the first indicator may be coded with a truncated unary code.
      6) Alternatively, furthermore, the corresponding APS information (e.g., ph_TX_aps_id for ALF APS) used by slices may be signaled under the condition check of the values of the first indicator.
    ii. A second indicator of enabling/disabling coding tool TX for the lower level (e.g., slice_TX_present_flag) may be signaled at the lower level (e.g., in slice header) and it may be conditionally signalled by checking the value of the first indicator.
      1) In one example, the second indicator may be signalled under the condition check of 'the first indicator is equal to Y'.
        a) Alternatively, the second indicator may be signalled under the condition check of 'the value of first indicator>>1' or 'the value of first indicator/2' or 'the value of first indicator & 0x01'.

b) Alternatively, furthermore, the second indicator may be absent and inferred to be enabled when the first indicator is equal to Y; or inferred to be disabled when the first indicator is equal to Z.
2) Whether to signal the second indicator may depend on the first indicator and/or whether current picture consists more than one slice (or whether PH syntax is not present in SH).
a) If the first indicator tells the coding tool TX is enabled for at least one slice but not all slices, and the PH syntax is not present in SH (or pps_one_slice_per_picture_flag is false), the second indicator may be signalled.
b) If either the first indicator tells the coding tool TX is enabled or disabled for all slices, or the PH syntax is present in SH (or pps_one_slice_per_picture_flag is true), signalling of the second indicator may be skipped.
i. Alternatively, furthermore, when not signalled, it is inferred according to the value of the first indicator, e.g., set to the value of the first indicator or set to (first indictor==0?0:1).
b. In a second example, one or more of the sub-bullets below are applied:
i. More than one indicator may be signaled at the higher level (e.g., in picture header (PH)) to specify how coding tool TX is enabled at lower level.
1) In one example, two indicators (e.g., two 1-bit flags) may be signaled in PH.
a) In one example, a first indicator specifies whether there is at least one slice associated with the PH that enables coding tool TX. And a second indicator specifies whether all slices associated with the PH enable coding tool TX.
ii. Alternatively, furthermore, the second indicator may be conditionally signalled according to the value of the first indicator, e.g., when the first indicator specifies there is at least one slice that enables coding tool TX.
I. Alternatively, furthermore, when the second indicator is not present, it is inferred that all slices enable coding tool TX.
II. Alternatively, it is required that the second indicator must be false if the first indicator is false in a conformance bit-stream.
iii. Alternatively, furthermore, a third indicator may be conditionally signalled in SH according to at least one of the value of the first indicator and the value of the second indicator, e.g., when the first indicator specifies that at least one slice enables the coding tool TX and the second indicator specifies that not all of slices enable coding tool TX.
1. Alternatively, furthermore, when the third indicator is not present, it may be inferred according to the value of the first and/or second indicator (e.g., inferred to be equal to the value of the first indicator).
b) Alternatively, a first indicator specifies whether there is at least one slice associated with the PH that disables coding tool TX. And a second indicator specifies whether all slices associated with the PH disable coding tool TX.
i. Alternatively, furthermore, the second indicator may be conditionally signalled according to the value of the first indicator, e.g., when the first indicator specifies there is at least one slice that disable coding tool TX.
I. Alternatively, furthermore, when the second indicator is not present, it is inferred that all slices associated with the PH disable coding tool TX.
ii. Alternatively, furthermore, a third indicator may be conditionally signalled in SH according to at least one of the value of the first indicator and the value of the second indicator, e.g., when the first indicator specifies that at least one slice enables the coding tool TX and the second indicator specifies that not all of slices disable coding tool TX.
I. Alternatively, furthermore, when the third indicator is not present, it may be inferred according to the value of the first and/or second indicator (e.g., inferred to be equal to the value of the first indicator).
2) Alternatively, furthermore, the first indicator may be conditionally signalled according to the value of the coding tool TX enabling flag in sequence level (e.g., sps_TX_enabled_flag).
ii. A third indicator of enabling/disabling coding tool TX for the lower level (e.g., slice_TX_enabled_flag) may be signaled at the lower level (e.g., in slice header) and it may be conditionally signalled by checking the value of the first indicator and/or second indicator.
3) In one example, the third indicator may be signalled under the condition check of 'not all slices enable coding tool TX' or 'not all slices disable coding tool TX'.
c. In a third example, two 1-bit flags may be signaled at the higher level (e.g., in picture header (PH)) to specify how coding tool TX is enabled at lower level (e.g., in slice header (SH)).
i. The first PH flag (e.g. named ph_all_slices_use_TX_flag) equal to 1 specifies that all slices of the picture use coding tool TX. The first PH flag equal to 0 specifies that each slice of the picture may or may not use coding tool TX.
ii. The second first PH flag (e.g. named ph_no_slice_uses_TX_flag) equal to 1 specifies that no slice of the picture uses coding tool TX. The second PH flag equal to 0 specifies that each slice of the picture may or may not use coding tool TX.
iii. The second PH flag is only signalled when the first PH flag is equal to 0.
iv. When the first PH flag is equal to 1 or when (the first PH flag is equal to 0 and the second PH flag is equal to 0), a scaling list APS ID is signalled in the PH.
v. When the first PH flag is equal to 0 and the second flag is equal to 0, an SH flag (e.g., named slice_use_TX_flag) is signalled in the SH.
vi. When the first PH flag is equal to 1, the value of the SH flag is inferred to be equal to 0.
vii. When the first PH flag is equal to 0 and the second PH flag is equal to 0, the value of the SH flag is inferred to be equal to 0.
viii. If the value of SH flag is equal to 1, coding tool TX is used for decoding the slice. Otherwise, coding tool TX is used for decoding the slice.
d. In a fourth example, one or more indicators of whether one or more or each of the scaling list related aspects (e.g., enabling/disabling, APS IDs) are present in PH or SH may be signaled.
  i. Alternatively, one indicator is used, and furthermore, the indicator is a 1-bit flag.
    1) In one example, when the indicator specifies the related aspects are present in PH, all slices infer the values presented in PH, and the signalling of those related aspects are skipped in SH.
    2) In one example, when the indicator specifies the related aspects are present in SH, and the signalling of those related aspects are skipped in PH.
  ii. In one example, the one or more indicators are signalled in the PH.
  iii. In another example, the one or more indicators are signalled in the PPS.
  iv. In another example, the one or more indicators are signalled in the SPS.

General

10. The proposed methods mentioned above may be extended to other coding tools, e.g., using a non-binary-valued indicator to indicate the mode type.
11. Whether to signal the related information (e.g., in PH/SH) may be further controlled by some syntax element in higher level, such as in PPS/SPS.
  d. Alternatively, whether to signal the related information (e.g., in PPS/PH/SH) may be further controlled by some syntax element in higher level, such as in SPS.
  e. In one example, a syntax element may be present in the higher level to indicate whether on/off control could be different within a set of pictures, a picture or a slice.

Figure 5:
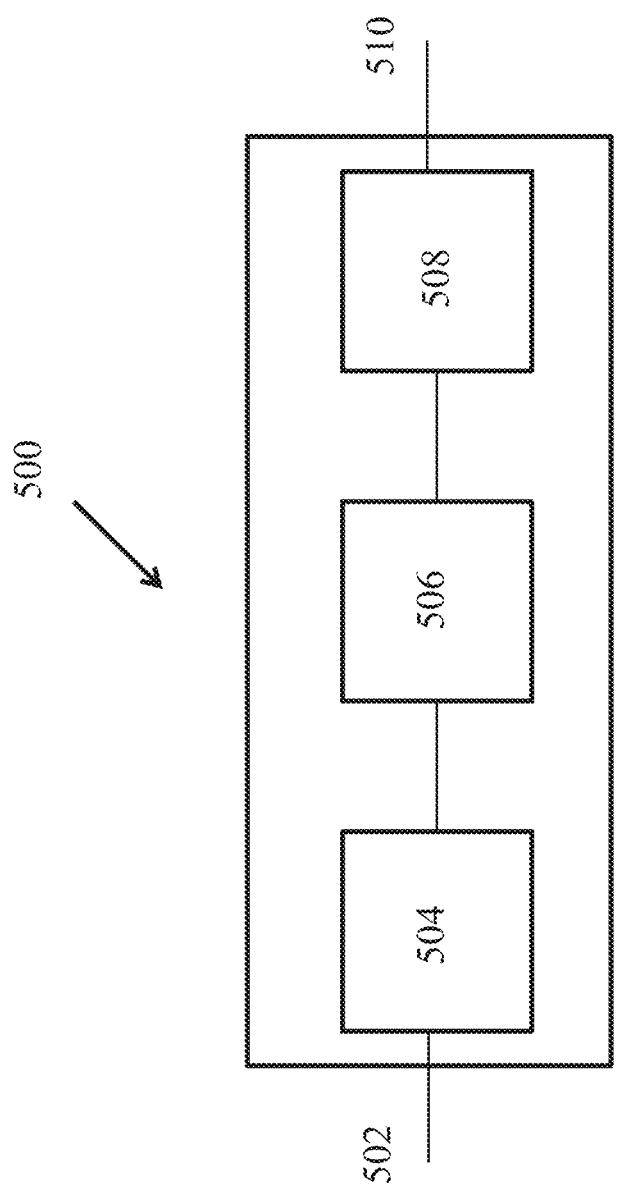
FIG. 5 is a block diagram of an example video processing system.

FIG. 5 is a block diagram showing an example video processing system 500 in which various techniques disclosed herein may be implemented. Various implementations may include some or all of the components of the system 500. The system 500 may include input 502 for receiving video content. The video content may be received in a raw or uncompressed format, e.g., 8 or 10 bit multi-component pixel values, or may be in a compressed or encoded format. The input 502 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 500 may include a coding component 504 that may implement the various coding or encoding methods described in the present document. The coding component 504 may reduce the average bitrate of video from the input 502 to the output of the coding component 504 to produce a coded representation of the video. The coding techniques are therefore sometimes called video compression or video transcoding techniques. The output of the coding component 504 may be either stored, or transmitted via a communication connected, as represented by the component 506. The stored or communicated bitstream (or coded) representation of the video received at the input 502 may be used by the component 508 for generating pixel values or displayable video that is sent to a display interface 510. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 6:
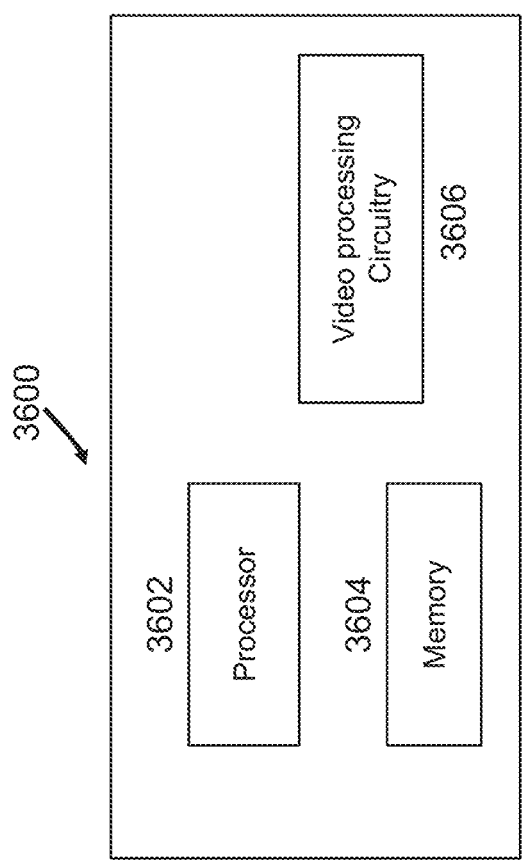
FIG. 6 is a block diagram of a video processing apparatus.

FIG. 6 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present document. The memory (memories) 3604 may be used for storing data and code used for implementing the methods and techniques described herein. The video processing hardware 3606 may be used to implement, in hardware circuitry, some techniques described in the present document.

Figure 8:
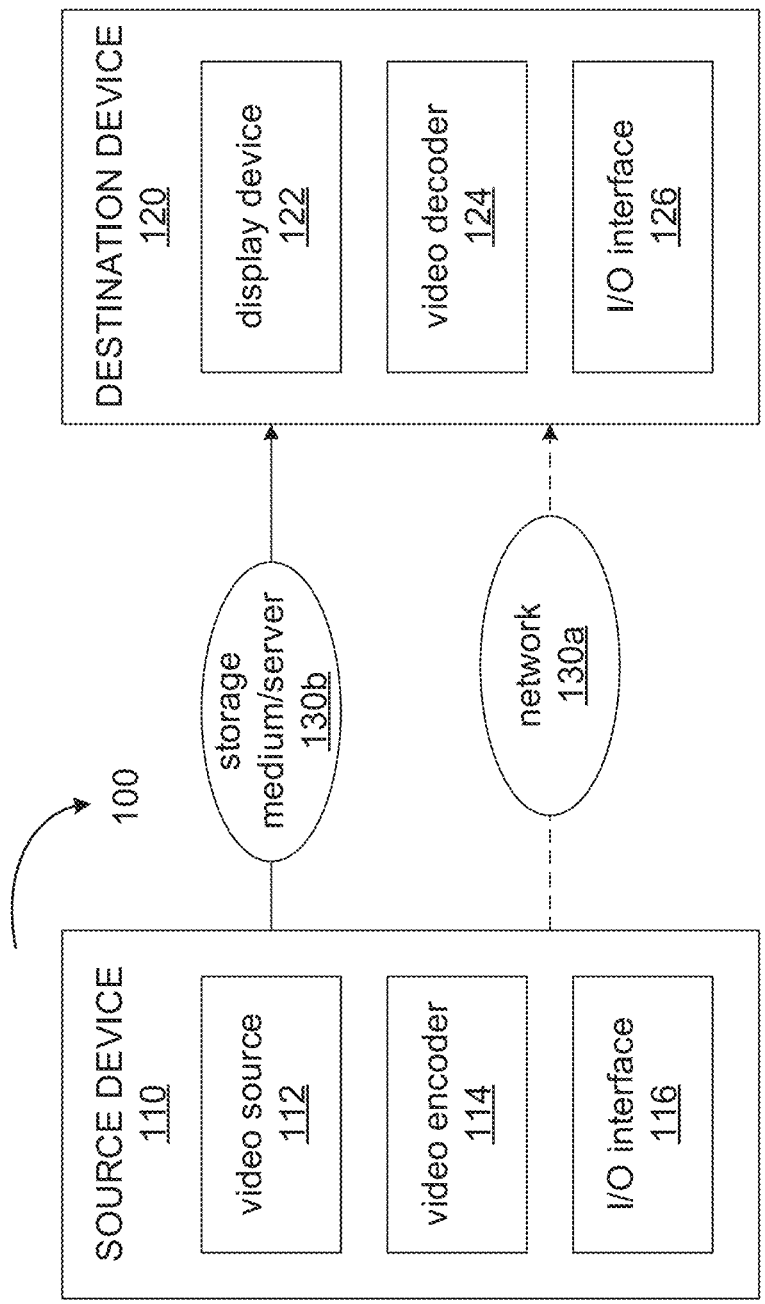
FIG. 8 is a block diagram that illustrates a video coding system in accordance with some embodiments of the present disclosure.

FIG. 8 is a block diagram that illustrates an example video coding system 100 that may utilize the techniques of this disclosure.

As shown in FIG. 8, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVM) standard and other current and/or further standards.

Figure 9:
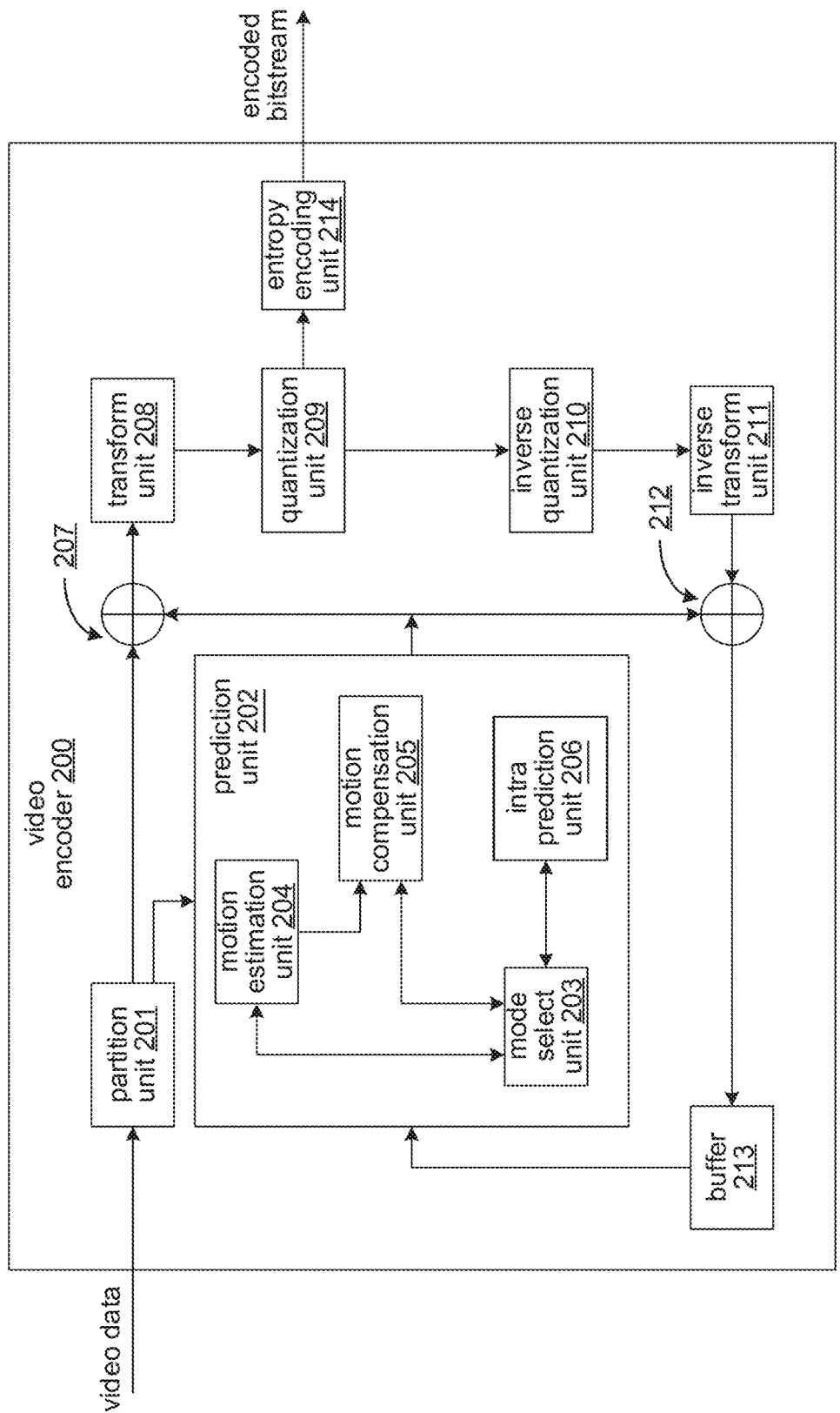
FIG. 9 is a block diagram that illustrates an encoder in accordance with some embodiments of the present disclosure.

FIG. 9 is a block diagram illustrating an example of video encoder 200, which may be video encoder 114 in the system 100 illustrated in FIG. 8.

Video encoder 200 may be configured to perform any or all of the techniques of this disclosure. In the example of FIG. 9, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a prediction unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 9 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 10:
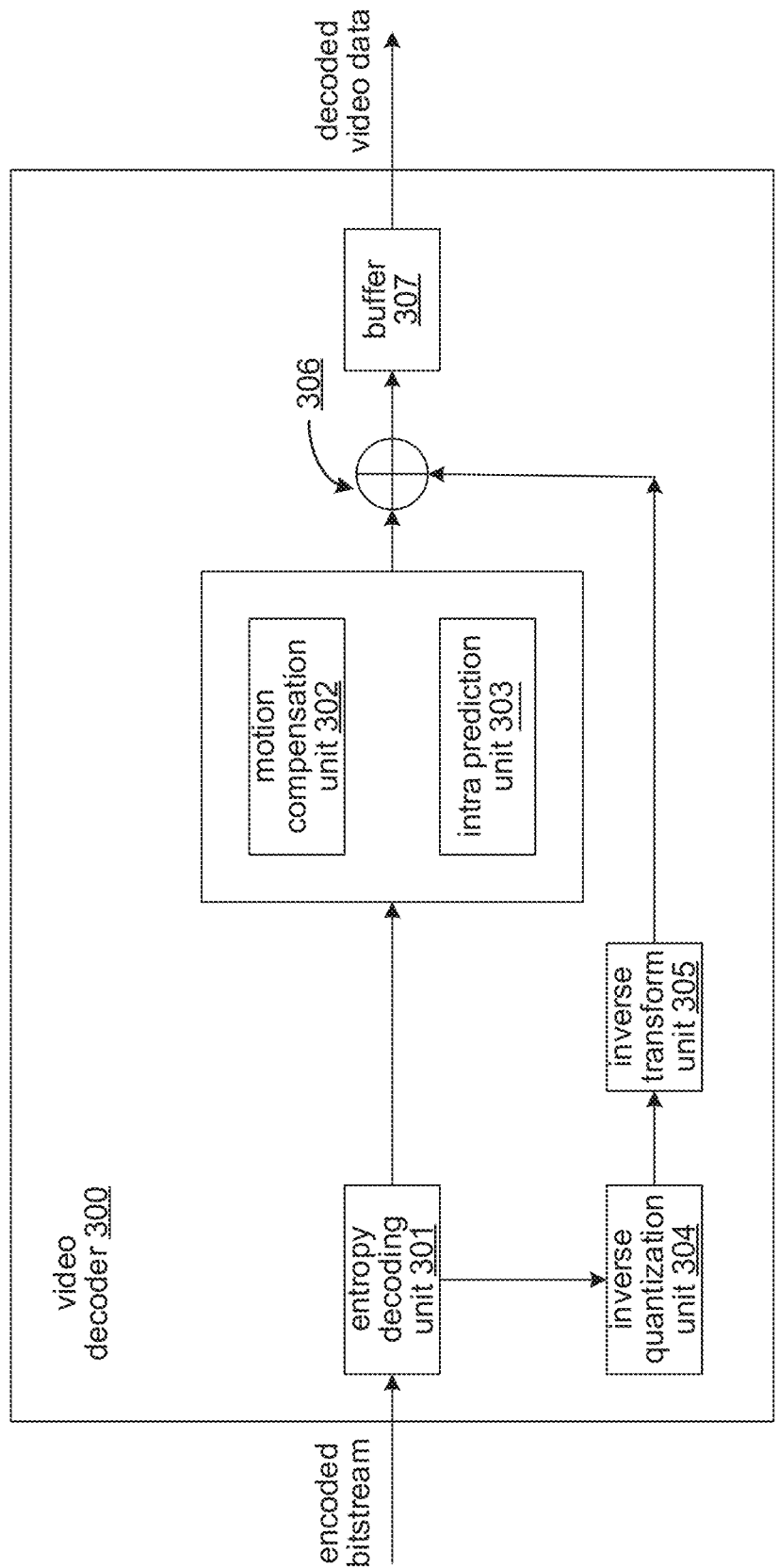
FIG. 10 is a block diagram that illustrates a decoder in accordance with some embodiments of the present disclosure.

FIG. 10 is a block diagram illustrating an example of video decoder 300 which may be video decoder 124 in the system 100 illustrated in FIG. 8.

The video decoder 300 may be configured to perform any or all of the techniques of this disclosure. In the example of FIG. 10, the video decoder 300 includes a plurality of functional components. The techniques described in this disclosure may be shared among the various components of the video decoder 300. In some examples, a processor may be configured to perform any or all of the techniques described in this disclosure.

In the example of FIG. 10, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 9).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 304 inverse quantizes, i.e., de-quantizes, the quantized video block coefficients provided in the bitstream and decoded by entropy decoding unit 301. Inverse transform unit 305 applies an inverse transform.

Reconstruction unit 306 may sum the residual blocks with the corresponding prediction blocks generated by motion compensation unit 302 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

A listing of solutions preferred by some embodiments is provided next.

The following solutions show example embodiments of techniques discussed in the previous section (e.g., item 1).

Figure 7:
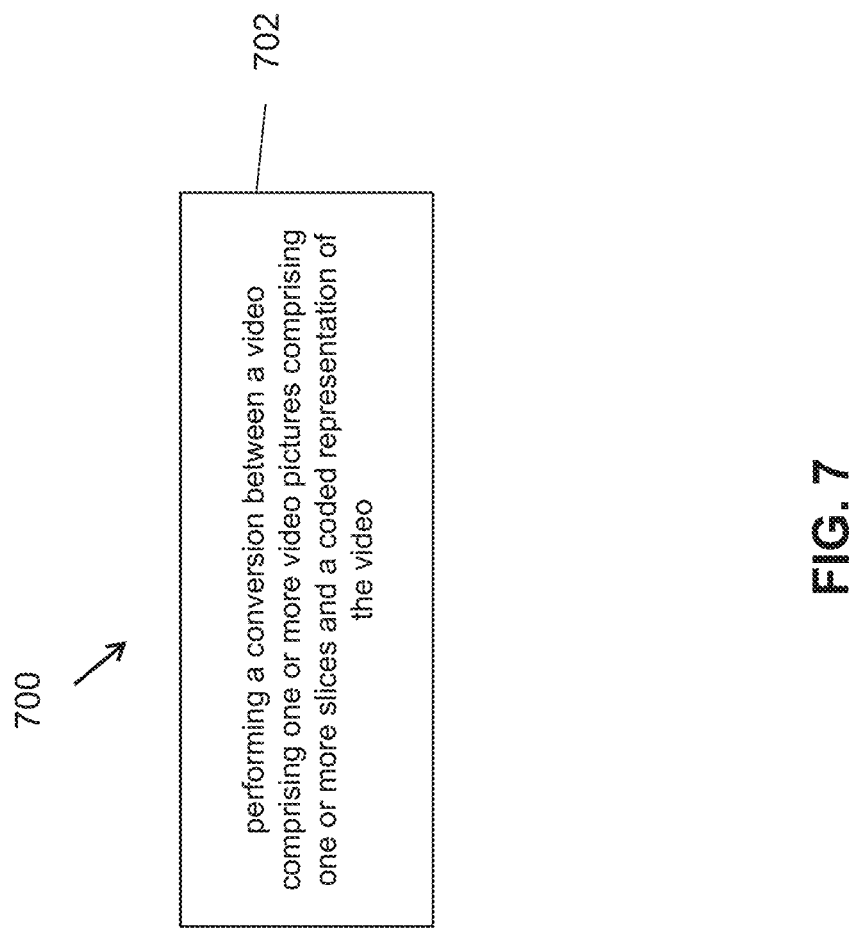
FIG. 7 is a flowchart for an example method of video processing.

1. A video processing method (e.g., method 700 depicted in FIG. 7), performing (702) a conversion between a video comprising one or more video pictures comprising one or more slices and a coded representation of the video; wherein the coded representation conforms to a format rule, wherein the format rule specifics which luma mapping with chroma scaling modes or scaling list mode types are applicable to the conversion of a slice is indicated by a picture header syntax structure in a slice header or a picture header in a picture comprising a single slice.

2. The method of solution 1, wherein the format rule specifies that the picture header syntax structure in the packet header indicates that only two mode types are allowed.

The following solutions show example embodiments of techniques discussed in the previous section (e.g., item 2).

3. A video processing method, comprising: performing a conversion between a video comprising one or more video pictures comprising one or more slices and a coded representation of the video; wherein the coded representation conforms to a format rule, wherein the format rule specifies to include an indicator that indicates enablement of a luma mapping with chroma scaling (LMCS) mode at a first video level dependent on a non-binary LMCS related syntax element at a higher level and whether a picture only consists of one slice.

4. The method of solution 3, wherein the first video level is a slice level.

5. The method of any of solutions 3-4, wherein the higher level corresponds to a picture or a sequence or a picture parameter set level.

The following solutions show example embodiments of techniques discussed in the previous section (e.g., item 3-4).

6. A video processing method, comprising: performing a conversion between a video comprising one or more video pictures comprising one or more slices and a coded representation of the video; wherein the coded representation conforms to a format rule, wherein the format rule specifies to include an indicator that indicates enablement of an explicit scaling list (ESL) mode at a first video level dependent on a non-binary LMCS related syntax element at a higher level and whether a picture only consists of one slice.

7. The method of solution 6, wherein the first video level is a slice level.

8. The method of any of solutions 6-7, wherein the higher level corresponds to a picture or a sequence or a picture parameter set level.

The following solutions show example embodiments of techniques discussed in the previous section (e.g., items 5-8).

9. A video coding method, comprising: performing a conversion between a video comprising one or more pictures comprising one or more slices and a coded representation of the video, wherein the coded representation conforms to a format rule, wherein the format rule specifies that whether a picture includes exactly one slice controls whether a slice type or slice type flags in a slice header of the exactly one slice.

10. The method of solution 9, wherein the format rule specifies that, for a picture having exactly one slice, a corresponding picture header syntax structure must be included in the slice header.

The following solutions show example embodiments of techniques discussed in the previous section (e.g., item 9).

11. A video coding method, comprising: performing a conversion between a video comprising one or more pictures comprising one or more video regions and a coded representation of the video, wherein the coded representation conforms to a format rule, wherein the format rule specifies to include a two-level signaling of applicability of a filtering coding tool (TX) to a video region.

12. The method of solution 11, wherein the two-level signaling comprises a higher level signaling that is at a video-picture level or higher and a lower level signaling that is at a slice-level or lower.

13. The method of any of solutions 11-12, wherein the higher level signaling comprises a non-binary-valued indicator.

14. The method of any of solutions 11-13, wherein the lower level signaling comprises a binary-valued indicator.

15. The method of solution 12, wherein the higher level signaling comprises two 1-bit flags indicating whether all, some or conditionally some video regions at lower level have the TX mode enabled.

16. The method of any of solutions 11-15, wherein the filtering coding tool comprises use of a scaling list.

17. The method of any of solutions 1 to 16, wherein the conversion comprises encoding the video into the coded representation.

18. The method of any of solutions 1 to 16, wherein the conversion comprises decoding the coded representation to generate pixel values of the video.

19. A video decoding apparatus comprising a processor configured to implement a method recited in one or more of solutions 1 to 18.

20. A video encoding apparatus comprising a processor configured to implement a method recited in one or more of solutions 1 to 18.

21. A computer program product having computer code stored thereon, the code, when executed by a processor, causes the processor to implement a method recited in any of solutions 1 to 18.

22. A method, apparatus or system described in the present document.

Figure 13:
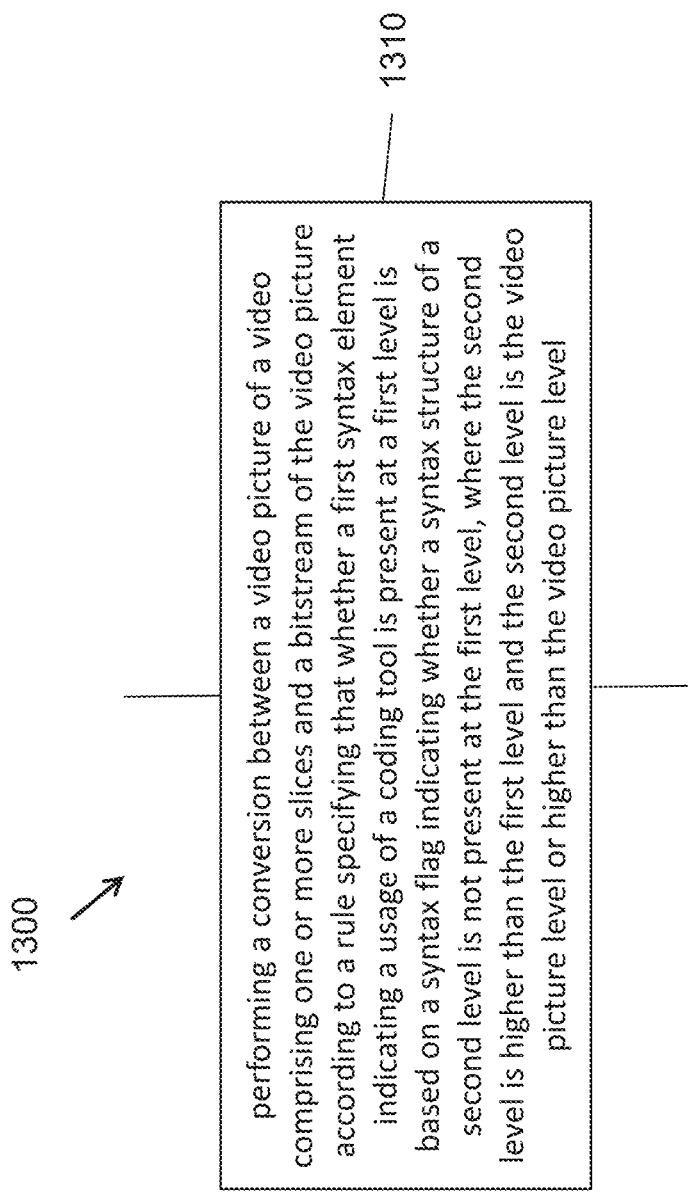
FIG. 13 is a flowchart representation of a method for video processing in accordance with the present technology.

FIG. 13 is a flowchart representation of a method 1300 for video processing in accordance with the present technology. The method 1300 includes, at operation 1310, performing a conversion between a video picture of a video comprising one or more slices and a bitstream of the video picture according to a rule. The rule specifies whether a first syntax element indicating a usage of a coding tool is present at a first level is based on a syntax flag indicating whether a syntax structure of a second level is not present at the first level. The second level is higher than the first level, and the second level is the video picture level or higher than the video picture level.

In some embodiments, the first level comprises a slice header, and the second level comprises a picture header. In some embodiments, whether the video picture includes a single slice is indicated by the syntax flag.

In some embodiments, the rule further specifies that whether the first syntax element is present at the first level is further based on a value of a second syntax element indicating a usage of the coding tool at the second level. In some embodiments, the usage of the coding tool at the first level is based on (1) the syntax flag indicating whether the syntax structure of the second level is not present at the first level, and (2) the value of the second syntax element.

In some embodiments, the coding tool includes a tool that maps luma samples to particular values and optionally applies a scaling operation to values of chroma samples. In some embodiments, the coding tool includes a luma mapping with chroma scaling tool. In some embodiments, the first syntax element indicating the usage of the luma mapping with chroma scaling tool is present in response to (1) the second syntax element indicating that the luma mapping with chroma scaling tool is enabled for at least one slice in the picture header, and (2) the syntax structure of the picture header not present in the slice header. In some embodiments, the first syntax element indicating the usage of the luma mapping with chroma scaling tool is omitted in response to (1) the syntax element indicating that the luma mapping with chroma scaling tool is disabled in the picture header, or (2) the syntax structure of the picture header present in the slice header. In some embodiments, in case the usage of the luma mapping with chroma scaling tool is omitted in the slice header, the usage is inferred according to the second syntax element indicated in the picture header.

In some embodiments, the coding tool includes an explicit scaling list. In some embodiments, the explicit scaling list is used in a scaling process for transform coefficients. In some embodiments, the first syntax element indicating the usage of the explicit scaling list is present in response to (1) the second syntax element indicating that the explicit scaling list is enabled for at least one slice in the picture header, and (2) the picture header syntax structure not present in the slice header. In some embodiments, the first syntax element indicating the usage of the explicit scaling list is omitted in response to (1) the second syntax element indicating that the explicit scaling list is disabled in the picture header, or (2) the picture header syntax structure present in the slice header. In some embodiments, in case the usage of the explicit scaling list is omitted in the slice header, the usage is inferred according to the second syntax element indicated in the picture header.

Figure 14:
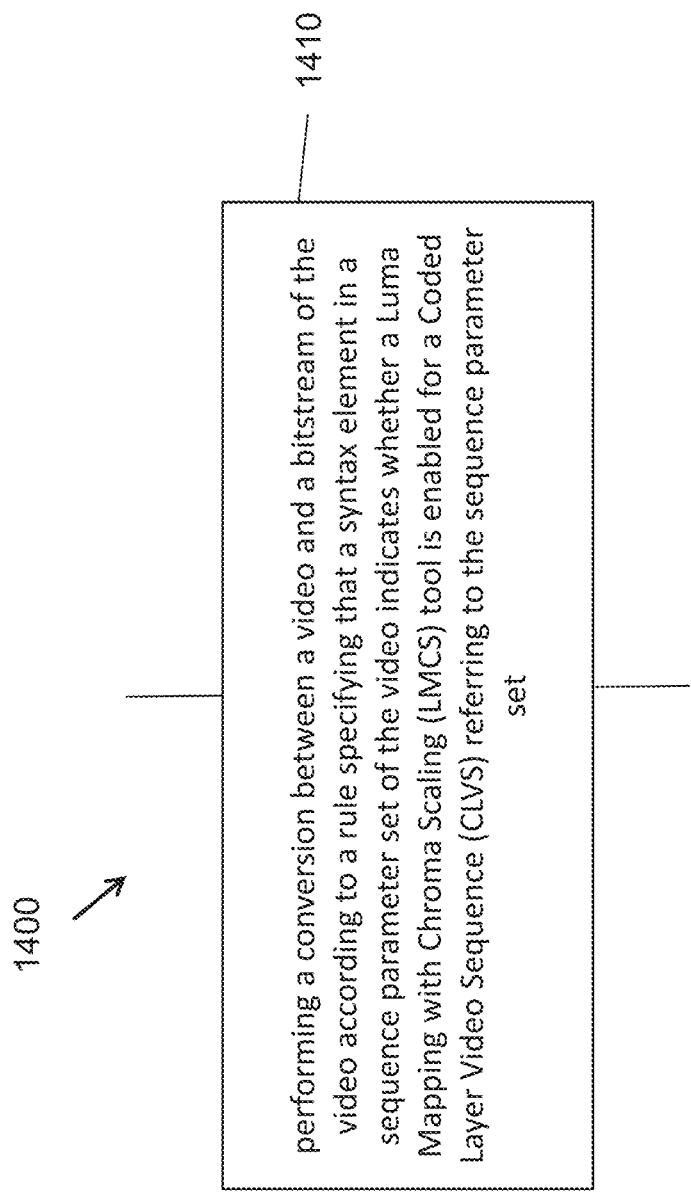
FIG. 14 is a flowchart representation of another method for video processing in accordance with the present technology.

FIG. 14 is a flowchart representation of a method 1400 for video processing in accordance with the present technology. The method 1400 includes, at operation 1410, performing a conversion between a video and a bitstream of the video according to a rule. The rule specifies that a syntax element in a sequence parameter set of the video indicates whether a Luma Mapping with Chroma Scaling (LMCS) tool is enabled for a Coded Layer Video Sequence (CLVS) referring to the sequence parameter set.

In some embodiments, the syntax element being equal to 1 specifies that the LMCS tool is enabled for the CLVS, and the syntax element being equal to 0 specifies that the LMCS tool is disabled for the CLVS.

Figure 15:
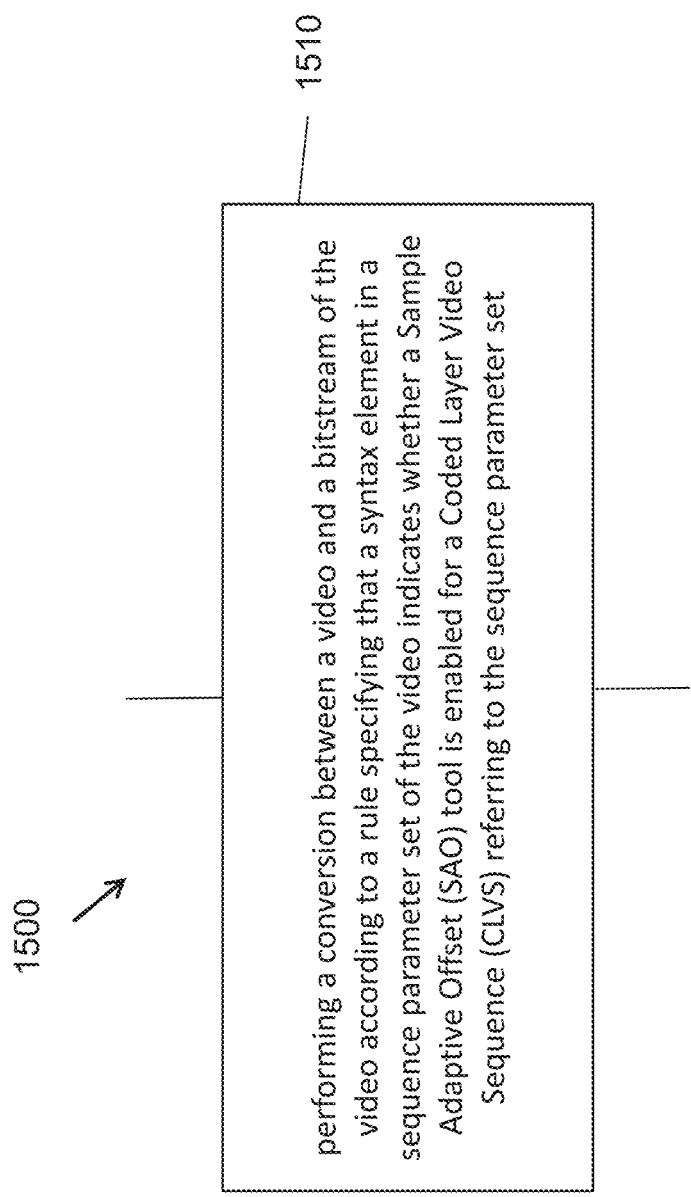
FIG. 15 is a flowchart representation of another method for video processing in accordance with the present technology.

FIG. 15 is a flowchart representation of a method 1500 for video processing in accordance with the present technology. The method 1500 includes, at operation 1510, performing a conversion between a video and a bitstream of the video according to a rule. The rule specifies that a syntax element in a sequence parameter set of the video indicates whether a Sample Adaptive Offset (SAO) tool is enabled for a Coded Layer Video Sequence (CLVS) referring to the sequence parameter set.

In some embodiments, the syntax element being equal to 1 specifies that the SAO tool is enabled for the CLVS, and the syntax element being equal to 0 specifies that the SAO tool is disabled for the CLVS.

Figure 16:
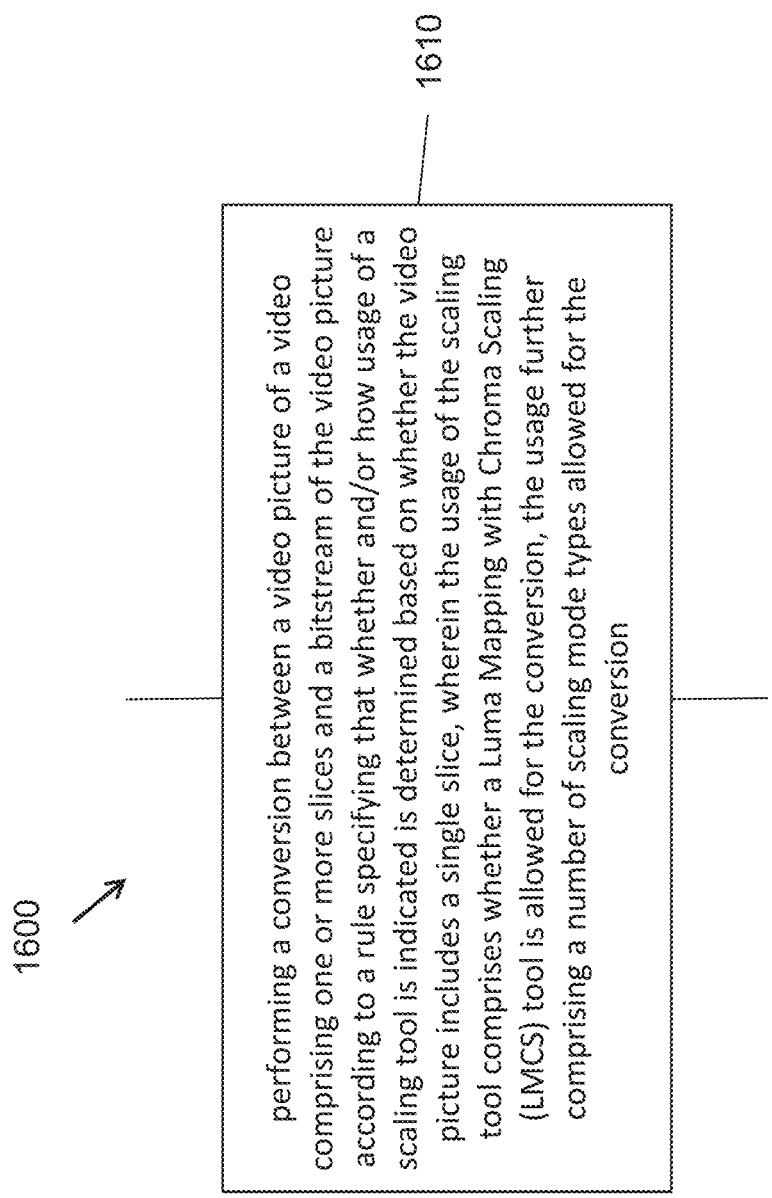
FIG. 16 is a flowchart representation of another method for video processing in accordance with the present technology.

FIG. 16 is a flowchart representation of a method 1600 for video processing in accordance with the present technology. The method 1600 includes, at operation 1610, performing a conversion between a video picture of a video comprising one or more slices and a bitstream of the video picture according to a rule. The rule specifies that whether and/or how usage of a scaling tool is indicated is determined based on whether the video picture includes a single slice. The usage of the scaling tool comprises whether a Luma Mapping with Chroma Scaling (LMCS) tool is allowed for the conversion. The usage further comprises a number of scaling mode types allowed for the conversion.

In some embodiments, the scaling mode types indicates whether the scaling tool is enabled or disabled for all or partial of the one or more slices of the video picture. In some embodiments, the rule specifies that whether the video picture includes a single slice is indicated by whether a picture header syntax structure of the video picture is present in a slice header of the slice. In some embodiments, the rule specifies that only two scaling mode types are allowed for the conversion in case the video picture includes a single slice. In some embodiments, the two scaling mode types are indicated by value 0 or 1.

Figure 17:
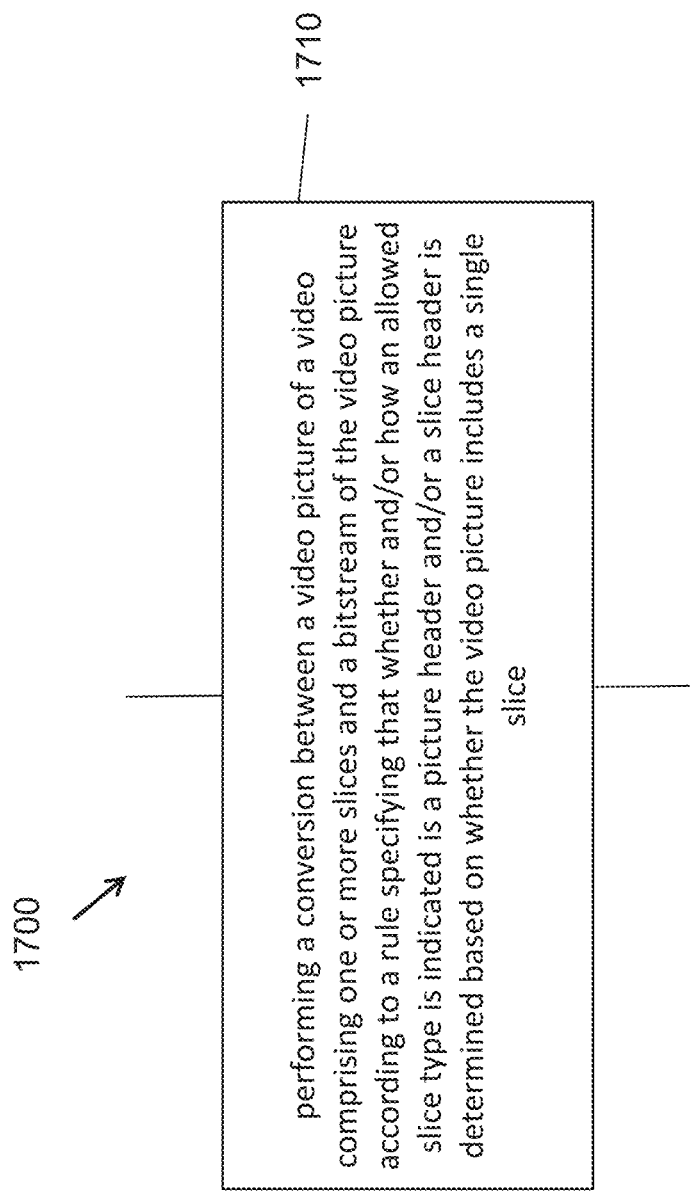
FIG. 17 is a flowchart representation of another method for video processing in accordance with the present technology.

FIG. 17 is a flowchart representation of a method 1700 for video processing in accordance with the present technology. The method 1700 includes, at operation 1710, performing a conversion between a video picture of a video comprising one or more slices and a bitstream of the video picture according to a rule. The rule specifies that whether and/or how an allowed slice type is indicated is a picture header and/or a slice header is determined based on whether the video picture includes a single slice.

In some embodiments, the rule specifies that whether the video picture includes a single slice is indicated by whether a picture header syntax structure of the video picture is present in a slice header of the slice. In some embodiments, in case the video picture includes a single slice, a first syntax flag in the picture header specifying whether all slices of the video picture have a specific slice type is omitted in case a second syntax flag in the picture header specifies that one or more slices in the video are allowed to have the specific slice type. In some embodiments, in case the video picture includes a single slice, a first syntax flag in the picture header specifying whether all slices of the video picture have a specific slice type is omitted in case a second syntax flag in the picture header specifies that one or more slices of coding type B are allowed. In some embodiments, in case the video picture includes a single slice, a first syntax flag in the picture header specifying whether one or more slices of coding type B are allowed is omitted in case a second syntax flag in the picture header specifies that all slices of the video picture have a specific slice type. In some embodiments, a type of a slice in the video picture is omitted and inferred.

Figure 18:
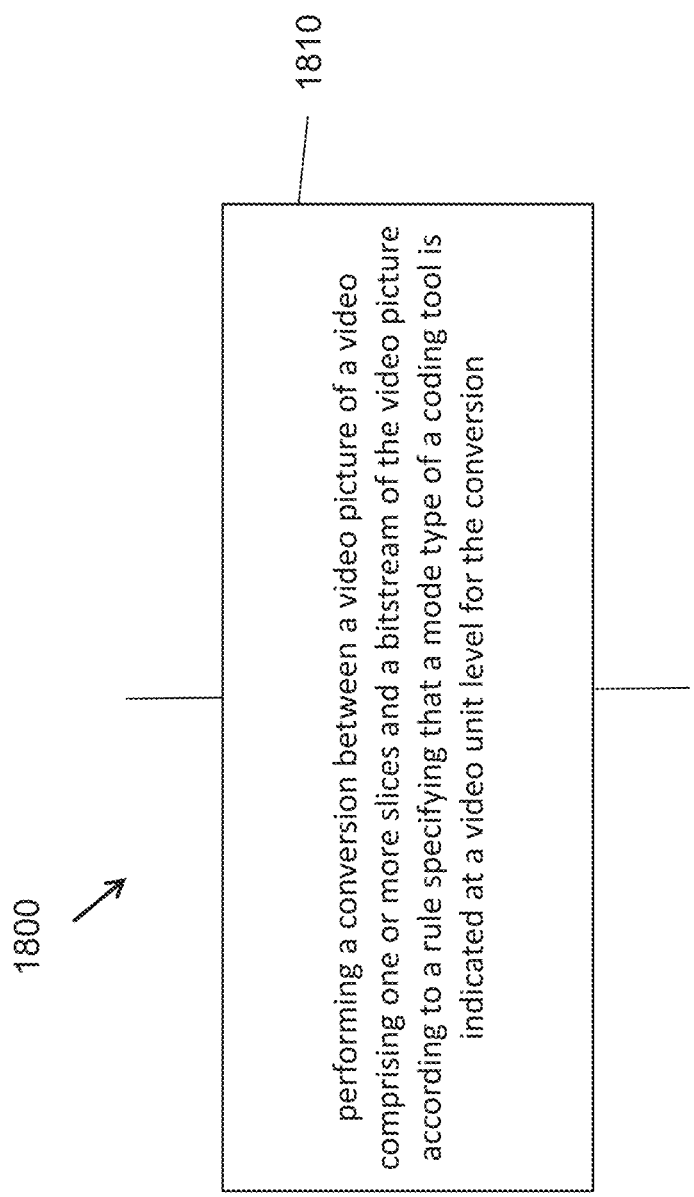
FIG. 18 is a flowchart representation of another method for video processing in accordance with the present technology.

FIG. 18 is a flowchart representation of a method 1800 for video processing in accordance with the present technology. The method 1800 includes, at operation 1810, performing a conversion between a video picture of a video comprising one or more slices and a bitstream of the video picture according to a rule. The rule specifies that a mode type of a coding tool is indicated at a video unit level for the conversion.

In some embodiments, the mode type comprises: (1) a first type indicating that the coding tool is enabled for all sub-units of the video unit, (2) a second type indicating that the coding tool is disabled for all sub-units of the video unit, (3) a third type indicating that the coding tool is enabled for at least one sub-unit but not all sub-units of the video unit. In some embodiments, the video unit comprises a picture. In some embodiments, a sub-unit comprises a slice, a tile, or a subpicture of the picture. In some embodiments, the mode type is indicated in a picture header or a picture parameter set.

In some embodiments, a number of allowed mode types is determined based on whether the video picture comprises a single slice. In some embodiments, only two mode types are allowed in case the video picture comprises a single slice. In some embodiments, how the mode type is indicated in determined based on whether the video picture comprises a single slice. In some embodiments, the mode type is limited to a subset of the number of allowed mode types in case the video picture comprises a single slice. In some embodiments, the rule specifies that whether the video picture includes a single slice is indicated by whether a picture header syntax structure of the video picture is present in a slice header of the slice.

Figure 19:
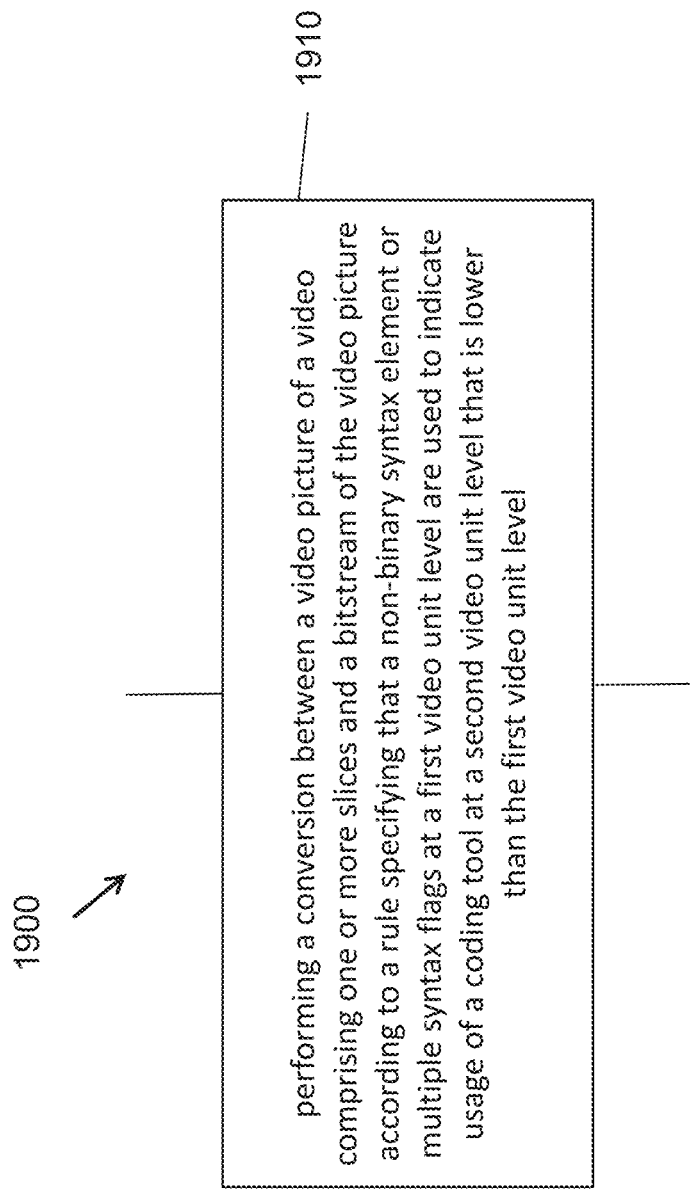
FIG. 19 is a flowchart representation of another method for video processing in accordance with the present technology.

FIG. 19 is a flowchart representation of a method 1900 for video processing in accordance with the present technology. The method 1900 includes, at operation 1910, performing a conversion between a video picture of a video comprising one or more slices and a bitstream of the video picture according to a rule. The rule specifies that a non-binary syntax element or multiple syntax flags at a first video unit level are used to indicate usage of a coding tool at a second video unit level that is lower than the first video unit level.

In some embodiments, the first video unit level includes a picture level, and the second video unit level includes a slice level. In some embodiments, the non-binary syntax element is coded using at least more than two bits. The non-binary syntax element being equal to X specifies that the coding tool is enabled for all slices associated with the video picture, the non-binary syntax element being equal to Y specifies that the coding tool is enabled for at least one but not all slices associated with the video picture, and the non-binary syntax element being equal to Z specifies that the coding tool is disabled for all slices associated with the video picture, wherein X !=Y, Y !=Z, and X !=Z.

In some embodiments, the non-binary syntax element is inferred to have a default value in case the non-binary syntax element is omitted. In some embodiments, the non-binary syntax element being equal to Y indicates that the coding tool is applicable in a scaling process for transform and/or non-transform coefficients for the conversion. In some embodiments, X=1, Y=2, and Z=0. In some embodiments, X=2, Y=1, and Z=0.

In some embodiments, the non-binary syntax element is conditionally indicated based on a corresponding syntax flag at a sequence level. In some embodiments, the non-binary syntax element is coded as an unsigned integer, an unsigned integer 0-th order Exp-Golomb-coded syntax element with a left bit first, or a truncated unary value. In some embodiments, corresponding adaptive parameter set information used by the one or more slices of the video picture is indicated based on the non-binary syntax element.

In some embodiments, the multiple syntax flags include a first syntax flag indicating whether the coding tool is enabled or disabled for at least one slice of the video picture, and a second syntax flag indicating whether the coding tool is enabled or disabled for all slices of the video picture. In some embodiments, the second syntax flag is conditionally indicated based on a value of the first syntax flag. In some embodiments, the second syntax flag is inferred to indicate that the coding tool is enabled or disabled for all slices in case the second syntax flag is omitted. In some embodiments, the rule specifies that, in case the first syntax flag indicates that the coding tool is not enabled for at least one slice of the video picture, the second syntax flag has a value indicating that the coding tool is disabled for all slices of the video picture.

In some embodiments, the multiple syntax flags further include a third syntax flag conditionally indicated in the slice header according to the first syntax flag or the second syntax flag. In some embodiments, the third syntax flag is inferred based on a value of the first syntax flag and/or the second syntax flag. In some embodiments, the third syntax flag is conditionally indicated according to a corresponding syntax flag at a sequence level.

In some embodiments, the multiple syntax flags include a first syntax flag indicating whether all slices of the video picture use the coding tool, and a second syntax flag indicating whether no slice of the video picture uses the coding tool. In some embodiments, the second syntax flag is indicated only when the first syntax flag indicates that not all slices of the video picture use the coding tool. In some embodiments, a scaling list adaptive parameter set identifier is included in the picture header in case the first syntax flag indicates that all slices of the video picture use the coding tool, or the first syntax flag and the second syntax flag indicate that at least one slice of the video picture uses the coding tool. In some embodiments, a third syntax flag in the slice header is indicated in case the first syntax flag indicates that not all slices of the video picture use the coding tool and the second syntax flag indicates that at least one slice of the video picture uses the coding tool. In some embodiments, a value of the third syntax flag is based on the first syntax flag and/or the second syntax flag.

In some embodiments, the coding tool is associated with usage or information of a scaling list. In some embodiments, the usage or the information of the scaling list is omitted in the second video unit level in case the non-binary syntax element or the multiple syntax flags are present in the first video unit level. In some embodiments, the multiple syntax flags are indicated in the first video unit level including a picture header, a picture parameter set, or a sequence parameter set. In some embodiments, a syntax element at the second video unit level is conditionally indicated based on the non-binary syntax element or the multiple syntax flags.

In some embodiments, indication of the non-binary syntax element or the multiple syntax flags is determined based on information in a third video unit level that is higher than the first video unit level. In some embodiments, the third video unit level includes a picture parameter set or a sequence parameter set. In some embodiments, a syntax element in the third video unit level indicates the usage of the coding tool is different within a set of pictures, a picture, or a slice.

In some embodiments, the conversion comprises encoding the video into the bitstream. In some embodiments, the conversion comprises decoding the bitstream to generate the video.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A video processing method, comprising:
performing a conversion between a video picture of a video comprising one or more slices and a bitstream of the video picture according to a rule,
wherein the rule specifies that whether a first syntax element indicating a usage of a coding tool is present at a first level is based on a syntax flag indicating whether a syntax structure of a second level is not present at the first level, wherein the second level is higher than the first level, and wherein the second level is a video picture level or higher than a video picture level.

2. The method of claim 1, wherein the first level comprises a slice header, and wherein the second level comprises a picture header.

3. The method of claim 1, wherein the rule further specifies that whether the first syntax element is present at the first level is further based on a value of a second syntax element indicating a usage of a coding tool at the second level.

4. The method of claim 3, wherein the usage of the coding tool at the first level is based on (1) the syntax flag indicating whether the syntax structure of the second level is not present at the first level, and (2) the value of the second syntax element.

5. The method of claim 1, wherein the coding tool includes an explicit scaling list.

6. The method of claim 5, wherein the explicit scaling list is used in a scaling process for transform coefficients.

7. The method of claim 5, wherein the first syntax element indicating the usage of the explicit scaling list is present in response to (1) a second syntax element indicating that the explicit scaling list is enabled for at least one slice in a picture header, and (2) a picture header syntax structure not present in a slice header.

8. The method of claim 5, wherein the first syntax element indicating the usage of the explicit scaling list is omitted in response to (1) a second syntax element indicating that the explicit scaling list is disabled in a picture header, or (2) a picture header syntax structure present in a slice header.

9. The method of claim 8, wherein, in case the usage of the explicit scaling list is omitted in the slice header, the usage is inferred according to the second syntax element indicated in the picture header.

10. The method of claim 1, wherein whether the video picture includes a single slice is indicated by the syntax flag.

11. The method of claim 1, wherein the performing the conversion comprising encoding the video into the bitstream.

12. The method of claim 1, wherein the performing the conversion comprises decoding the video from the bitstream.

13. An apparatus for processing video data comprising a processor and a non-transitory memory with instructions thereon, wherein the instructions upon execution by the processor, cause the processor to:
perform a conversion between a video picture of a video comprising one or more slices and a bitstream of the video picture according to a rule,
wherein the rule specifies that whether a first syntax element indicating a usage of a coding tool is present at a first level is based on a syntax flag indicating whether a syntax structure of a second level is not present at the first level, wherein the second level is higher than the first level, and wherein the second level is a video picture level or higher than the video picture level.

14. A non-transitory computer-readable storage medium storing instructions that cause a processor to:
perform a conversion between a video picture of a video comprising one or more slices and a bitstream of the video picture according to a rule,
wherein the rule specifies that whether a first syntax element indicating a usage of a coding tool is present at a first level is based on a syntax flag indicating whether a syntax structure of a second level is not present at the first level, wherein the second level is higher than the first level, and wherein the second level is a video picture level or higher than the video picture level.

15. A non-transitory computer-readable recording medium storing a bitstream of a video picture comprising one or more slices which is generated by a method performed by a video processing apparatus, wherein the method comprises:
generating the bitstream of the video picture according to a rule,
wherein the rule specifies that whether a first syntax element indicating a usage of a coding tool is present at a first level is based on a syntax flag indicating whether a syntax structure of a second level is not present at the first level, wherein the second level is higher than the first level, and wherein the second level is a video picture level or higher than the video picture level.

* * * * *